(12) United States Patent
Saito

(10) Patent No.: US 8,600,958 B2
(45) Date of Patent: Dec. 3, 2013

(54) SECURITY POLICY MANAGEMENT DEVICE, SECURITY POLICY MANAGEMENT SYSTEM, AND STORAGE MEDIUM

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 734 days.

(21) Appl. No.: 12/134,457

(22) Filed: Jun. 6, 2008

(65) Prior Publication Data

US 2009/0319480 A1  Dec. 24, 2009

(30) Foreign Application Priority Data

Dec. 25, 2007  (JP) .................................. 2007-331813

(51) Int. Cl.
  *G06F 17/30* (2006.01)
(52) U.S. Cl.
  USPC ......................................................... 707/694
(58) Field of Classification Search
  USPC ........... 707/758, 999.103, 694, 695; 713/201; 726/27
  See application file for complete search history.

(56) References Cited

U.S. PATENT DOCUMENTS

| | | | | |
|---|---|---|---|---|
| 7,680,830 | B1* | 3/2010 | Ohr et al. .................... | 707/999.2 |
| 2003/0182583 | A1* | 9/2003 | Turco ............................ | 713/201 |
| 2005/0171914 | A1 | 8/2005 | Saitoh | |
| 2005/0234859 | A1* | 10/2005 | Ebata ................................ | 707/1 |
| 2005/0262572 | A1* | 11/2005 | Yoneyama ...................... | 726/27 |
| 2006/0004820 | A1* | 1/2006 | Claudatos et al. ............. | 707/101 |
| 2006/0004847 | A1* | 1/2006 | Claudatos et al. ......... | 707/103 R |
| 2006/0004868 | A1* | 1/2006 | Claudatos et al. .......... | 707/104.1 |
| 2006/0253445 | A1* | 11/2006 | Huang et al. ....................... | 707/9 |
| 2007/0208665 | A1* | 9/2007 | Ohara .............................. | 705/51 |
| 2007/0271592 | A1 | 11/2007 | Noda et al. | |

FOREIGN PATENT DOCUMENTS

| | | |
|---|---|---|
| JP | 2004013493 | 1/2004 |
| JP | 2005259108 | 9/2005 |
| JP | 2007310579 | 11/2007 |

OTHER PUBLICATIONS

Japanese Notice of Grounds of Rejection with English translation thereof, mailed on Jan. 19, 2010, relating to Japanese Application No. 2007-331813.

* cited by examiner

*Primary Examiner* — Hung T Vy
(74) *Attorney, Agent, or Firm* — Gesmer Updegrove LLP

(57) ABSTRACT

Policy information stores policy setting information and identification information of a policy in correlation with each other, the policy setting information correlating setting content of the policy with each data type information indicating whether data for which the policy is set is original data or derived data. A data information storage stores identification information of data for which a policy is set in correlation with the data and identification information of the policy attached to the data, and information for identifying that the data is the derived data. A searching unit identifies, in response to a searching request, identification information of a policy correlated to the data whose identification information is designated in the searching request, identifies whether target data of the searching request is the original data or the derived data.

10 Claims, 25 Drawing Sheets

EXAMPLE DATA STRUCTURE OF SECURITY POLICY DB (FIRST EXEMPLARY EMBODIMENT)

| POLICY ID | POLICY NAME | TARGET DOCUMENT | USAGE RANGE | VALID TERM | PERMITTED FUNCTION LIST |
|---|---|---|---|---|---|
| 0001 | IN-SECTION REFERENCE FOR SOFTWARE DEVELOPMENT SECTION | ORIGINAL DOCUMENT | MEMBER ORGANIZATION: SOFTWARE DEVELOPMENT SECTION | 180 DAYS FROM CREATION | VIEW OF ELECTRONIC DOCUMENT PRINT OF ELECTRONIC DOCUMENT COPY OF PAPER DOCUMENT |
| | | | CREATOR | UNLIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT |
| | | DERIVED DOCUMENT | MEMBER ORGANIZATION: SOFTWARE DEVELOPMENT SECTION | 90 DAYS FROM CREATION | — |
| | | | CREATOR | 180 DAYS FROM CREATION | VIEW OF ELECTRONIC DOCUMENT PRINT OF ELECTRONIC DOCUMENT |
| 0002 | SALES REFERENCE | ORIGINAL DOCUMENT | UNLIMITED DURATION | 30 DAYS FROM CREATION | VIEW OF ELECTRONIC DOCUMENT |
| | | | MEMBER ORGANIZATION: SALES SECTION | 180 DAYS FROM CREATION | VIEW OF ELECTRONIC DOCUMENT EDIT OF ELECTRONIC DOCUMENT COPY OF PAPER DOCUMENT |
| | | | CREATOR | UNLIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT |
| | | DERIVED DOCUMENT | UNLIMITED RANGE | 30 DAYS FROM CREATION | VIEW OF ELECTRONIC DOCUMENT |
| ... | | | | ... | ... |

FIG. 5

EXAMPLE DATA STRUCTURE OF DOCUMENT INFORMATION DB (FIRST EXEMPLARY EMBODIMENT)

| DOCUMENT ID | DERIVATION ORIGIN DOCUMENT ID | POLICY ID | DOCUMENT NAME | MEDIA | OPERATOR ID | OPERATION DATE AND TIME | OPERATION |
|---|---|---|---|---|---|---|---|
| 40ffaaa4-0fb6-4634-85bf-bba45bc941b5 | — | 0001 | IN-SECTION REFERENCE | ELECTRONIC | fx12345 | JANUARY 20, 2007 10:00 | CREATE |
| 4FB6BB00-3347-11d0-B40A-00AA005FF586 | — | 0002 | CATALOG OF Model2006 | ELECTRONIC | fx19810 | OCTOBER 1, 2006 10:00 | CREATE |
| AED6483F-3304-11d2-86F1-006008B0E5D2 | 4FB6BB00-3347-11d0-B40A-00AA005FF586 | — | — | PAPER | fx25615 | OCTOBER 3, 2006 14:23 | PRINT |
| FDF9C30D-CCAB-3E2D-B584-9E24CE8038E3 | AED6483F-3304-11d2-86F1-006008B0E5D2 | — | — | PAPER | fx16982 | OCTOBER 10, 2006 16:32 | COPY |
| ⋮ | ⋮ | ⋮ | ⋮ | ⋮ | ⋮ | ⋮ | |

FIG. 6

EXAMPLE SECURITY POLICY REGISTERING REQUEST

```
<PolicyRegister>
<DocumentID> 4FB6BB00-3347-11d0-B40A-00AA005FF586 </DocumentID>
<PolicyID>0002</PolicyID>
<DocumentName>SYSTEM SPECIFICATION.doc</DocumentName>
<Type>electric</Type>
<UserID>fx17691</UserID>
<Date> 2007-02-20T23:59:59+09:00 </Date >
</ PolicyRegister>
```

FIG. 12

EXAMPLE SECURITY POLICY SUMMARY RESPONSE

```
<Policies>
<Polocy>
<PolicyID>0001</PolicyID>
<Name>IN-SECTION REFERENCE FOR SOFTWARE DEVELOPMENT
SECTION</Name>
<AccessRight docType="original">
<Users><Group>SOFTWARE DEVELOPMENT SECTION</Group></Users>
<ValidTerm> 180days from creation</ValidTerm>
<Operations>
<View/><Print/><Copy/>
</Operations >
</AccessRight >
<AccessRight docType="original">
<Users><User>Owner</User></Users>
<ValidTerm> </ValidTerm>
<Operations>
<View/><Print/><Copy/><Edit/><Scan/>
</Operations >
</AccessRight>
</Policy>
<Policy> ...</Policy>
</Policies>
```

FIG. 13

EXAMPLE SECURITY POLICY SEARCH RESULT

<UsageRights>
<UserID>fx17691</UserID>
<PolicyID>0002</PolicyID>
<DocumentID> 4FB6BB00-3347-11d0-B40A-00AA005FF586 </DocumentID>
<ValidTo> 2007-02-20T23:59:59+09:00 </ValidTo>
<Operations>
<View/>
<Print/>
<Copy/>
</Operations >
</UsageRights>

FIG. 15

EXAMPLE DATA STRUCTURE OF SECURITY POLICY DB (SECOND EXEMPLARY EMBODIMENT)

| POLICY ID | POLICY NAME | USAGE RANGE | VALID TERM | PERMITTED FUNCTION LIST | POLICY ID AT TIME OF DERIVATION |
|---|---|---|---|---|---|
| 0001 | IN-SECTION REFERENCE FOR SOFTWARE DEVELOPMENT SECTION | MEMBER ORGANIZATION: SOFTWARE DEVELOPMENT SECTION | 180 DAYS FROM CREATION | VIEW OF ELECTRONIC DOCUMENT PRINT OF ELECTRONIC DOCUMENT COPY OF PAPER DOCUMENT | 0002 |
| | | CREATOR | UNLIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT | 0002 |
| 0002 | DERIVATION FROM IN-SECTION REFERENCE FOR SOFTWARE DEVELOPMENT SECTION | MEMBER ORGANIZATION: SOFTWARE DEVELOPMENT SECTION | 90 DAYS FROM CREATION | — | — |
| | | CREATOR | 180 DAYS FROM CREATION | VIEW OF ELECTRONIC DOCUMENT PRINT OF ELECTRONIC DOCUMENT | 0002 |
| ... | ... | ... | ... | ... | ... |

FIG. 27

ANOTHER EXAMPLE DATA STRUCTURE OF SECURITY POLICY DB (SECOND EXEMPLARY EMBODIMENT)

| POLICY ID | POLICY NAME | USAGE RANGE | VALID TERM | PERMITTED FUNCTION LIST | POLICY ID AT TIME OF DERIVATION |
|---|---|---|---|---|---|
| 0001 | IN-SECTION REFERENCE FOR SOFTWARE DEVELOPMENT SECTION | MEMBER ORGANIZATION: SOFTWARE DEVELOPMENT SECTION | 180 DAYS FROM CREATION | VIEW OF ELECTRONIC DOCUMENT | — |
| | | | | PRINT OF ELECTRONIC DOCUMENT | 0002 |
| | | | | COPY OF PAPER DOCUMENT | 0002 |
| | | CREATOR | UNLIMITED DURATION | VIEW OF ELECTRONIC DOCUMENT | — |
| | | | | EDIT OF ELECTRONIC DOCUMENT | 0001 |
| | | | | PRINT OF ELECTRONIC DOCUMENT | 0002 |
| | | | | COPY OF PAPER DOCUMENT | 0002 |
| | | | | SCAN OF PAPER DOCUMENT | 0002 |
| 0002 | DERIVATION FROM IN-SECTION REFERENCE FOR SOFTWARE DEVELOPMENT SECTION | MEMBER ORGANIZATION: SOFTWARE DEVELOPMENT SECTION | 90 DAYS FROM CREATION | — | — |
| | | CREATOR | 180 DAYS FROM CREATION | VIEW OF ELECTRONIC DOCUMENT | — |
| | | | | PRINT OF ELECTRONIC DOCUMENT | 0003 |
| ... | ... | | | ... | ... |

FIG. 28

EXAMPLE DATA STRUCTURE OF DOCUMENT INFORMATION DB (SECOND EXEMPLARY EMBODIMENT)

| DOCUMENT ID | DERIVATION ORIGIN DOCUMENT ID | POLICY ID | DOCUMENT NAME | MEDIA | OPERATOR ID | OPERATION DATE AND TIME | OPERATION |
|---|---|---|---|---|---|---|---|
| 40ffaaa4-0fb6-4634-85bf-bba45bc941b5 | — | 0001 | IN-SECTION REFERENCE | ELECTRONIC | fx12345 | JANUARY 20, 2007 10:00 | CREATE |
| 4FB6BB00-3347-11d0-B40A-00AA005FF586 | — | 0001 | CATALOG OF Model2006 | ELECTRONIC | fx19810 | OCTOBER 1, 2006 10:00 | CREATE |
| AED6483F-3304-11d2-86F1-006008B0E5D2 | 4FB6BB00-3347-11d0-B40A-00AA005FF586 | 0002 | — | PAPER | fx19810 | OCTOBER 3, 2006 14:23 | PRINT |
| FDF9C30D-CCAB-3E2D-B584-9E24CE8038E3 | AED6483F-3304-11d2-86F1-006008B0E5D2 | 0002 | — | PAPER | fx19810 | OCTOBER 10, 2006 16:32 | COPY |
| ⋮ | ⋮ | ⋮ | ⋮ | ⋮ | ⋮ | ⋮ | |

FIG. 29

EXAMPLE SECURITY POLICY SEARCH RESULT

<UsageRights>
<UserID> fx19810 </UserID>
<PolicyID>0001</PolicyID>
<DocumentID> 4FB6BB00-3347-11d0-B40A-00AA005FF586 </DocumentID>
<ValidTo> 2007-02-20T23:59:59+09:00 </ValidTo>
<Operations>
<View/>
<Edit/>
<Print/>
<Copy/>
<Scan/>
</Operations >
<DerivatePolicyID>0002</DerivatePolicy>
</UsageRights>

FIG. 31

ANOTHER EXAMPLE SECURITY POLICY SEARCH RESULT

<UsageRights>
<UserID> fx19810 </UserID>
<PolicyID>0001</PolicyID>
<DocumentID> 4FB6BB00-3347-11d0-B40A-00AA005FF586 </DocumentID>
<ValidTo> 2007-02-20T23:59:59+09:00 </ValidTo>
<Operations>
<View/>
<Edit>0001</Edit>
<Print>0002</Print>
<Copy>0002</Copy>
<Scan>0002</Scan>
</Operations >
</UsageRights>

FIG. 32

SECURITY POLICY MANAGEMENT DEVICE, SECURITY POLICY MANAGEMENT SYSTEM, AND STORAGE MEDIUM

CROSS-REFERENCE TO RELATED APPLICATIONS

This application is based on and claims priority under 35 USC 119 from Japanese Patent Application No. 2007-331813 filed on Dec. 25, 2007.

BACKGROUND

1. Technical Field

The present invention relates to a security policy management device, a security policy management system, and a recording medium.

2. Related Art

Currently, many companies define a basic policy for information security, that is, a security policy (hereinafter also simply referred to as "policy") and manage data such as electronic documents and paper documents according to the security policy.

However, in the related art, because a new document created by the derivation (hereinafter referred to as "derived document") is always protected under the same security policy as the original document, it has not been possible to flexibly manage the documents such as setting different securities for the derived document and the original document.

SUMMARY

According to one aspect of the present invention, there is provided a security policy management device having a policy information storage that stores policy setting information and identification information of a policy in correlation with each other, the policy setting information correlating setting content of the policy to each data type information indicating whether data for which the policy is set is original data or derived data which is created deriving from existing data, a data information storage that stores identification information of data for which a policy is set in correlation to the data and identification information of the policy attached to the data, and that also stores, when the data is the derived data, information for identifying that the data is the derived data, and a searching unit that identifies, in response to a searching request designating identification information of data, identification information of a policy correlated to the data whose identification information is designated in the searching request by referring to the data information storage, identifies whether target data of the searching request is the original data or the derived data, and returns setting content of the policy identified by searching the policy information storage based on the identified identification information of the policy and a data type of the target data of the searching request to an origin of the searching request.

BRIEF DESCRIPTION OF THE DRAWINGS

Exemplary embodiments of the present invention will be described in detail based on the following figures, wherein:

FIG. 5 is a diagram showing an example data structure of a security policy database in a first exemplary embodiment according to the present invention;

FIG. 6 is a diagram showing an example data structure of a document information database in a first exemplary embodiment according to the present invention;

FIG. 12 is a diagram showing an example of a registering request of a security policy sent from an external device in a first exemplary embodiment according to the present invention;

FIG. 13 is a diagram showing an example of a policy summary list created by a security policy server in a first exemplary embodiment according to the present invention;

FIG. 15 is a diagram showing an example search result obtained by a security policy search process in a first exemplary embodiment according to the present invention;

FIG. 27 is a diagram showing an example data structure of a security policy database in a second exemplary embodiment according to the present invention;

FIG. 28 is a diagram showing another example data structure of a security policy database in a second exemplary embodiment according to the present invention;

FIG. 29 is a diagram showing an example data structure of a document information database in a second exemplary embodiment according to the present invention;

FIG. 31 is a diagram showing an example search result obtained through a security policy search process when a security policy database shown in FIG. 27 is used in a second exemplary embodiment of the present invention; and FIG. 32 is a diagram showing an example search result obtained through a security policy search process when a security policy database shown in FIG. 28 is used in a second exemplary embodiment of the present invention.

DETAILED DESCRIPTION

Exemplary embodiments of the present invention will now be described with reference to the drawings.

First Exemplary Embodiment

Figure 1:
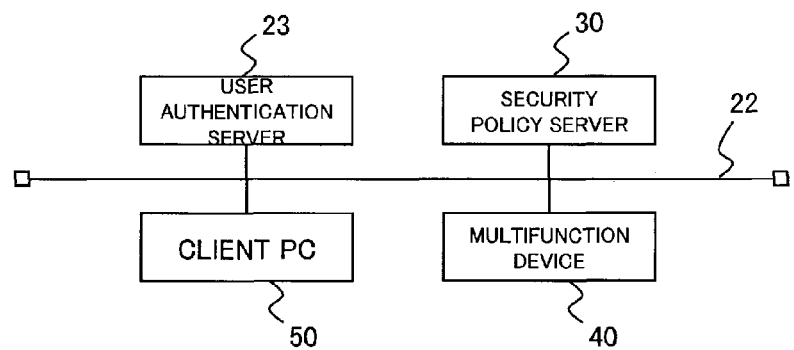
FIG. 1 is a diagram showing an overall structure of an exemplary embodiment of a policy management system according to the present invention.

FIG. 1 is an overall structural diagram showing an exemplary embodiment of a security policy management system according to the present invention. FIG. 1 shows a structure in which a user authentication server 23, a security policy server 30, a personal computer (PC) which becomes a client (hereinafter, "client PC") 50, and a multifunction device 40 are connected to a LAN (Local Area Network) 22 which is a form of network. Although FIG. 1 shows one client PC 50 and one multifunction device 40, alternatively, it is also possible to connect multiple client PCs 50 and/or multiple multifunction devices 40 to the LAN 22.

In FIG. 1, the user authentication server 23 is a server computer which collectively manages user authentication. In the other devices such as the client PC 50, the devices are controlled so that the use of the device is allowed after authentication of the user. The device requests user authentication from the user authentication server 23. The user authentication server 23 may be an LDAP (Lightweight Directory Access Protocol) server or a server such as Windows (registered trademark) Active Directory.

The security policy server 30 operates as a policy switching device, and also has a function to manage an access right for an electronic document and a paper document protected by the security handled by the present system (hereinafter collectively referred to as "protected document"). The security policy server 30 further has a function to manage a derivation relationship showing how the protected document was created.

The client PC 50 communicates with the security policy server 30 and creates an electronic document which is protected (hereinafter also referred to as a "protected electronic document") by attaching a security policy to a document which is not protected. In addition, on the client PC 50, a document application which executes a process such as viewing, printing, and editing on a protected electronic document operates within a scope permitted in the security policy.

The multifunction device 40 is a form of image processor on which multiple functions are provided. The multifunction device 40 in the present exemplary embodiment has functions of a printer and a copier as basic functions. In the present system, in addition to these basic functions, because the multifunction device 40 has a built-in computer, the multifunction device 40 can operate as a client computer similar to the client PC 50, and communicates with the security policy server 30, to provide functions such as printing of a protected electronic document and copying and scanning of a paper document which is protected (hereinafter also referred to as a "protected paper document") in a scope permitted in the policy.

A protected document handled in the present exemplary embodiment will next be described. In the present exemplary embodiment, as described above, a document to which a security policy is attached and in which operation is restricted is called a protected document. The protected document includes two types: an electronic document and a paper document. In either case, on the security policy server 30, the protected document is correlated to a particular policy, identification information of the document (document ID) is attached, and the document is managed.

Figure 2:
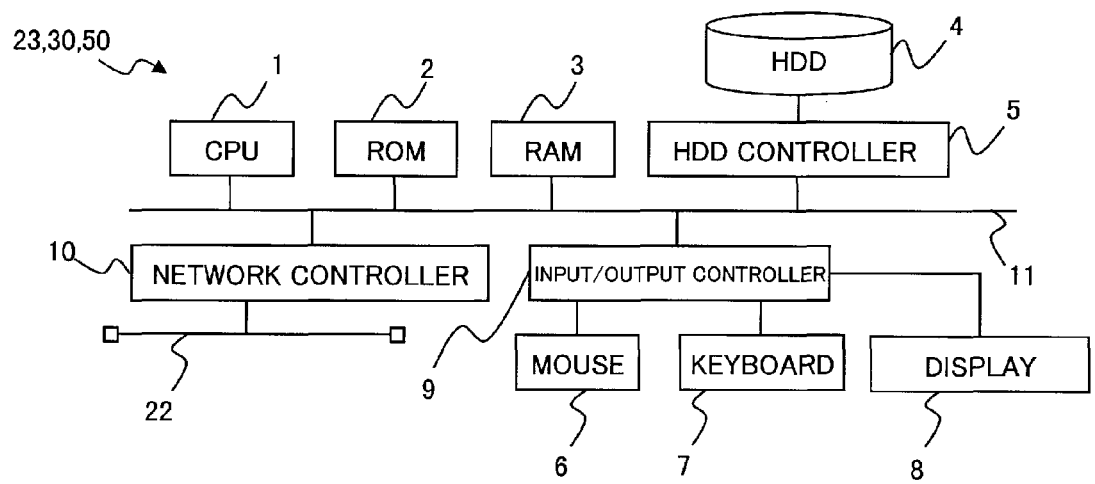
FIG. 2 is a diagram showing a hardware structure of a server computer which forms a security policy server in a first exemplary embodiment according to the present invention.

FIG. 2 is a hardware structural diagram of a server computer forming the security policy server 30 in the present exemplary embodiment. The security policy server 30 in the present exemplary embodiment can be realized with a general-purpose hardware structure which already exists. That is, the computer is constructed by connecting, to an internal bus 11, a CPU 1, a ROM 2, a RAM 3, an HDD controller 5 to which a hard disk drive (HDD) 4 is connected, an input/output controller 9 to which a mouse 6 and a keyboard 7 which are provided as input units and a display 8 provided as a display device are connected, and a network controller 10 provided as a communication unit.

Although the performances may differ, the user authentication server 23 and the client PC 50 are also formed with computers, and thus the hardware structures of these units are similar to that shown in FIG. 2.

Figure 3:
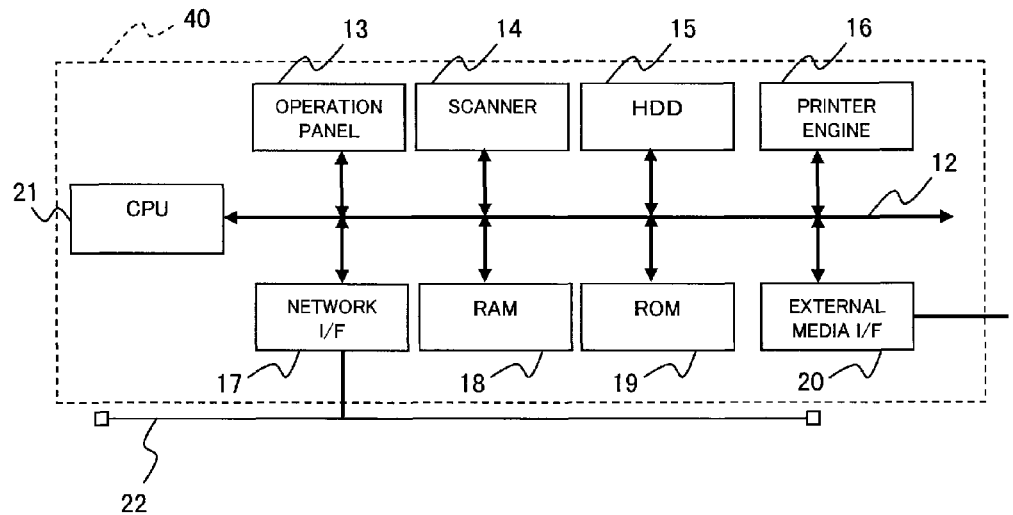
FIG. 3 is a diagram showing a hardware structure of a multifunction device in a first exemplary embodiment according to the present invention.

FIG. 3 is a hardware structural diagram of the multifunction device 40 in the present exemplary embodiment. As described above, the multifunction device 40 is a multifunction device on which various functions such as a copy function and a scanner function are provided, and has a built-in computer. In FIG. 3, a CPU 21 controls operations of various mechanisms equipped in the multifunction device 40 such as a scanner 14 and a printer engine 16 according to a program stored in a ROM 19. An address data bus 12 enables communication of data through connection with various mechanisms to be controlled by the CPU 21. An operation panel 13 receives an instruction from a user and displays information. A scanner 14 reads a document which is set by the user and stores in an HDD 15 or the like as electronic data. The HDD 15 stores the electronic document or the like which is read using the scanner 14. A private box is also provided in the HDD 15. The printer engine 16 prints an image on output paper according to an instruction from a control program which is executed by the CPU 21. A network interface (I/F) 17 connects the LAN 22, and is used for transmission of electronic data created by the multifunction device 40, reception of an electronic mail transmitted and destined for the multifunction device 40, and access to the multifunction device 40 via a browser. A RAM 18 is used as a work memory during execution of a program and a communication buffer during transmission and reception of electronic data. The ROM 19 stores various programs related to control of the multifunction device 40, encryption of the electronic data, and transmission and reception of the electronic data. With execution of various programs, the constituent elements to be described later achieve predetermined processing functions. An external media interface (I/F) 20 is an interface with an external memory device such as a USB memory and a flash memory.

Figure 4:
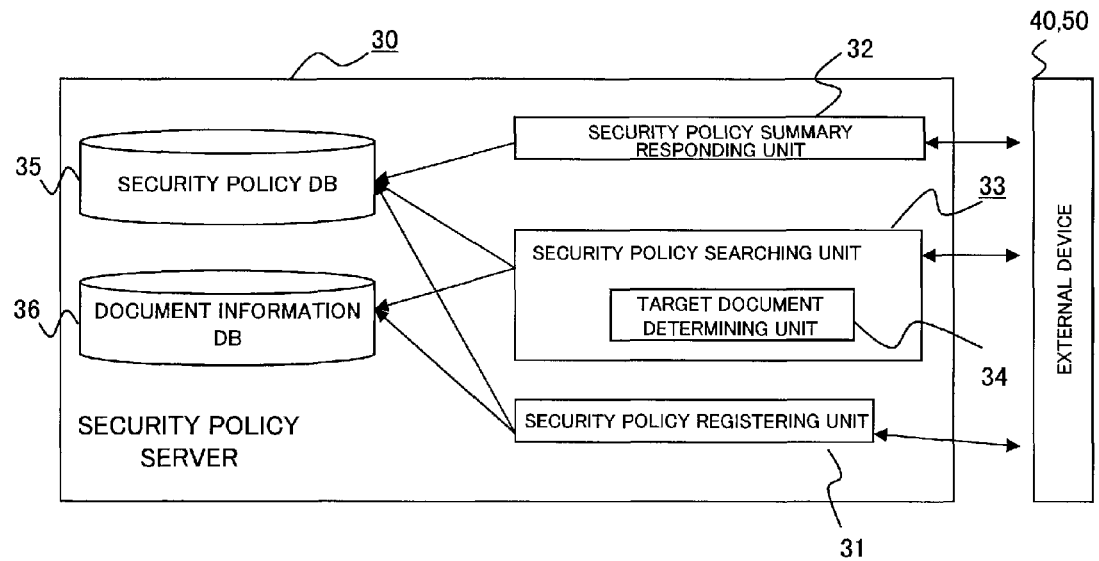
FIG. 4 is a block diagram showing a structure of a security policy server in a first exemplary embodiment according to the present invention.

FIG. 4 is a block structural diagram of the security policy server 30 in the present exemplary embodiment. FIG. 4 shows a security policy registering unit 31, a security policy summary responding unit 32, a security policy searching unit 33, a security policy database (DB) 35, and a document information database (DB) 36. The security policy registering unit 31 is made up of first and second registering units which create, in response to a registering request transmitted from the multifunction device 40 and the client PC 50 (hereinafter collectively referred to as "external device"), a new record including information such as the document ID designated in the registering request, a derivation origin document ID, a policy ID, and a user ID, and register the record in the document information database 36. In the present exemplary embodiment, the document ID is uniquely created. In other words, because a UUID (Universally Unique IDentifier) is used, it is not necessary to check whether or not there is data of the designated document ID in the database. Alternatively, a configuration may be employed in which such a checking process is executed.

In the present exemplary embodiment, a security policy summary response is a function to reference a summary list to see which policy can be attached when an external device attaches a policy on the document. The security policy summary responding unit 32 searches policy data registered in the security policy database 35 in response to the inquiry, creates a summary list of policies that match the search condition, and returns the summary list to the inquiring device. The security policy summary responding unit 32 returns a summary list of policies in response to the inquiry (policy summary acquiring request). It is also possible to employ a configuration in which, when the external device requests the policy from the security policy server 30, the external device designates a user ID for which a policy is to be attached. In this case, it is possible to check whether or not the user is included in a list of users who can be registered which is determined in advance, or to provide a list, for each policy, of users for whom registration of the policy is permitted, and check this list.

In the present exemplary embodiment, the security policy search is a function for the external device to request information of a security policy related to a document for which a policy is already set. In this process, the external device requests security policy information while designating the document ID of the document in question and the user ID of the requesting user, and the security policy searching unit 33 returns the policies corresponding to the request (searching request) to the requesting device.

A target document determining unit 34 included in the security policy searching unit 33 determines whether or not an inquired document (target document) is an original document or a derived document.

The security policy server 30 has the security policy database 35 as a database for managing a security policy (what right is to be permitted to whom) and the document information database 36 as a database for managing document information (which document is assigned to which security policy, when the document is created and by whom, etc.). Details of the databases 35 and 36 will now be described with reference to FIGS. 5 and 6.

FIG. 5 is a diagram showing an example data structure of the security policy database 35 in the present exemplary embodiment. In the security policy database 35, policy setting information which is set for each target document is registered in correlation to a policy ID for identifying a policy and a name of the policy. For each target document, type information is set indicating whether the document for which the policy is set is an original document or a derived document deriving from an original document. The policy setting information which is set for each target document includes a usage range, and a valid term and a permitted function list which are set for each usage range. The usage range is application information which identifies users to whom the policy is applied and a user group which is managed by the user authentication server 23 is set for the usage range. Each user group includes at least one user. The valid term is a valid term of the document to which the policy is attached. A description format for the valid term is not limited to the number of elapsed days from creation as exemplified in FIG. 5, and may be set by various methods including the expiration period (date and time) of the valid term. The permitted function list sets an operation permitted to the users in the usage range. For example, in FIG. 5, for the case of the policy ID of "0001", if a person who belongs to a software development section and who is not the creator of the document accesses a protected document having this policy attached, that person is permitted to view and print an electronic document and copy a paper document within 180 days from the time of creation of the document. When a paper document is created by copying an original document, the paper document is a derived document derived from the original document. According to FIG. 5, when a policy of the policy ID "0001" is applied to a derived document, because the permitted function list shows "-" (which indicates that there is no right), users other than the creator do not have any authority and cannot copy or scan even when the user attempts to copy or scan the derived document to which the policy of policy ID "0001" is attached.

FIG. 6 is a diagram showing an example data structure of the document information database 36 in the present exemplary embodiment. In the present exemplary embodiment, a document is handled as data for which policy is set, and the document information database 36 is thus provided as the data information storage. In the document information database 36, a document ID which is an identifier of the document (in the case of this example configuration, represented with UUID), a derivation origin document ID in which the document ID of a document which is the origin of the document (for example, printing origin, copying origin, etc.) is set, a policy ID of a security policy followed by the document, a document name, a media type of the document (paper or electronic), a user ID of the user operating the document, an operation (policy attachment) date and time, and the operation executed when the target document is created, are registered in correspondence with each other. For example, in the case of the document on the third row in FIG. 6 (a record starting with a document ID of "AED6"), a document which is the derivation origin of the document is a document on the second row in FIG. 6 (a record starting with the document ID of "4FB6"), and the policy ID is the policy ID "0002" of the derivation origin document. When a derivation origin document ID is further set in the record of the derivation origin document, similar to the above, the derivation origin documents are traced, and a policy ID of a document with no set derivation origin document ID and a set policy ID is set as the policy ID of the document.

The media type of the document on the third row in FIG. 6 is paper. In other words, according to FIG. 6, the document on the third row is a paper document created by a user, to whom a user ID of "fx25615" is assigned, printing (deriving by printing a derivation origin document) on Oct. 3, 2006, 14:23. Such a policy database and document information database can be realized with existing technologies, and the data structure is not limited to the data structure exemplified in FIG. 6, as long as the data structure allows attachment of a security policy for each document.

The constituent elements 31-34 in the security policy server 30 are realized by cooperation of a computer equipped in the security policy server 30 and a program executed by the CPU 1 equipped in the computer. The databases 35 and 36 are realized with the HDD 4 equipped in the computer.

Figure 7:
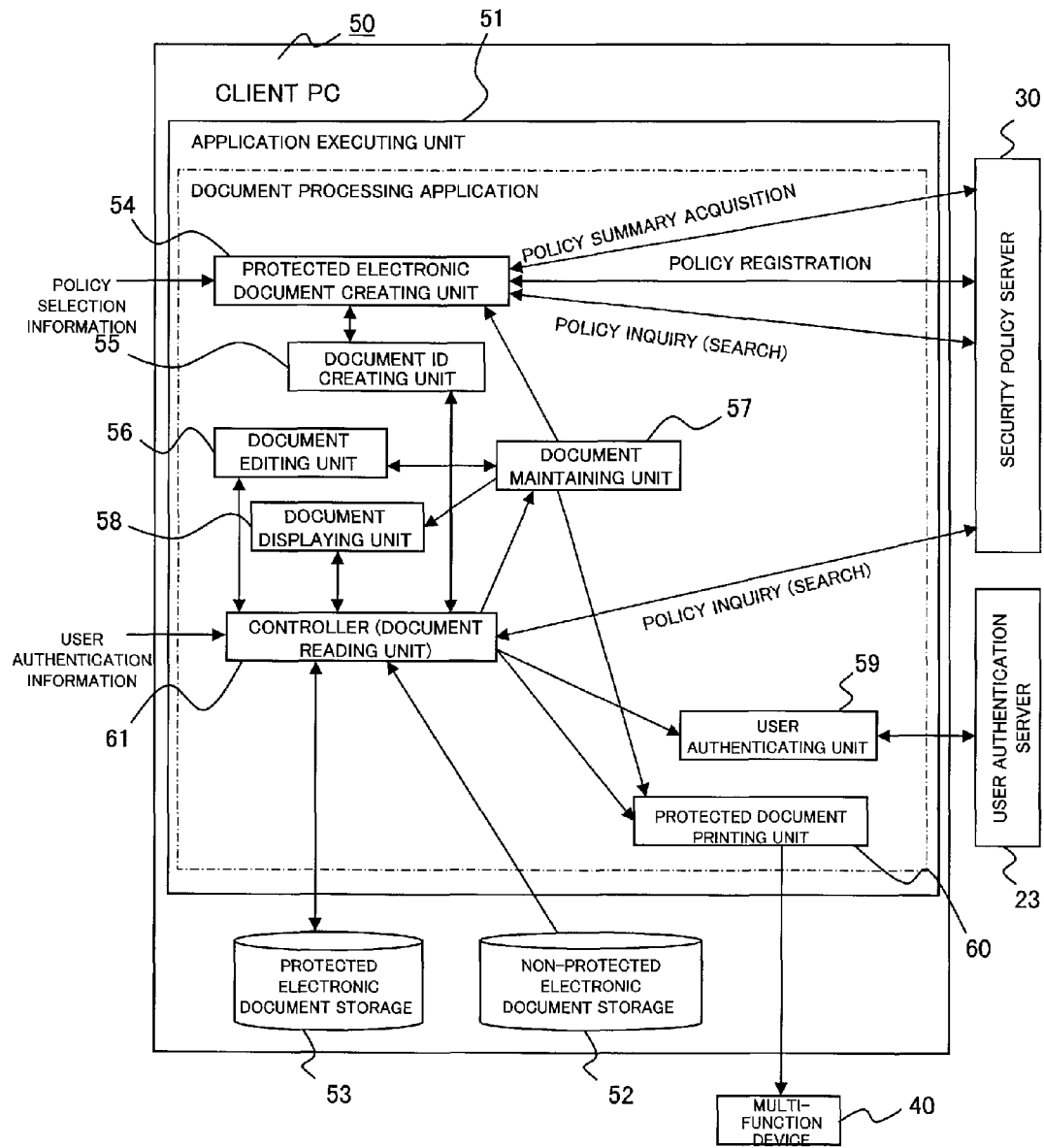
FIG. 7 is a block diagram showing a structure of a client PC in a first exemplary embodiment according to the present invention.

FIG. 7 is a block structural diagram of the client PC 50 in the present exemplary embodiment. The client PC 50 used by a normal user executes an operation of protection of an electronic document or editing, printing, or the like of a protected electronic document within a scope of right permitted in the policy, through execution of a predetermined document processing application. The client PC 50 has an application executing unit 51 which executes an application, a non-protected document storage 52 which stores an electronic document which is not protected, and a protected electronic document storage 53 which stores an electronic document which is protected. The application executing unit 51 communicates with the security policy server 30, and executes the document processing application including a constituent element to be described later, to provide functions such as protection of a non-protected electronic document and viewing, editing, and printing of a protected electronic document.

More specifically, a protected electronic document creating unit 54 sets a policy on a non-protected electronic document and creates a protected electronic document. A document ID creating unit 55 creates a document ID to be assigned to the protected document to be newly created. A document editing unit 56 applies editing on an electronic document which is read from each of the storages 52 and 53 or to an electronic document sent from the outside, according to an instruction by user operation. A document maintaining unit 57 temporarily maintains an edited electronic document. While the other constituent elements are realized by software loaded on the RAM 3, the document maintaining unit 57 is realized by the RAM 3. A document displaying unit 58 displays an electronic document to be viewed and an electronic document to be edited on the display 8. A user authenticating unit 59 executes a user authentication process at the start of use of the client PC 50. A protected document printing unit 60 executes printing of a protected document. A controller 61 controls operations of the overall structure of the constituent elements, and provides functions of the document processing application. The controller 61 also functions as a document reading unit which reads an electronic document stored in each of the storages 52 and 53.

The constituent elements 54-56 and 58-61 in the client PC 50 are realized by cooperation of a PC forming the client PC 50 and a program which is executed by the CPU 1 equipped in the PC. The storage 52 and 53 are realized by the HDD 4 equipped in the client PC 50.

Figure 8:
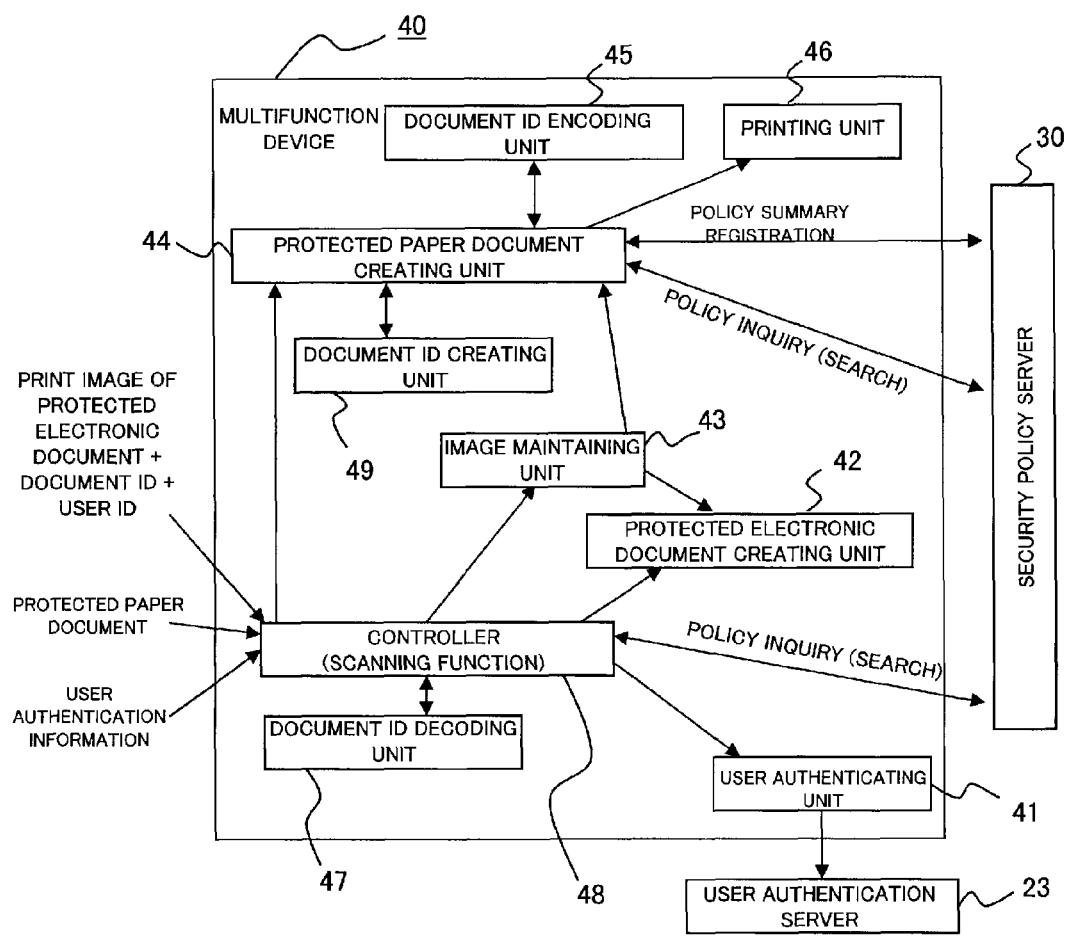
FIG. 8 is a block diagram showing a structure of a multifunction device in a first exemplary embodiment according to the present invention.

FIG. 8 is a block structural diagram of the multifunction device 40 in the present exemplary embodiment. The multifunction device 40 provides a printing function of a protected electronic document and copying and scanning functions of a protected paper document. The multifunction device 40 includes a user authenticating unit 41, a protected electronic document creating unit 42, an image maintaining unit 43, a protected paper document creating unit 44, a document ID encoding unit 45, a printing unit 46, a document ID decoding unit 47, a controller 48, and a document ID creating unit 49. The user authenticating unit 41 executes a user authentication process at a start of use of the multifunction device 40. The protected electronic document creating unit 42 sets a policy on a protected paper document which is read by scanning, and creates a protected electronic document. The image maintaining unit 43 temporarily maintains a created protected electronic document. While the other constituent elements are realized by software loaded on the RAM 18, the image maintaining unit 43 is realized by the RAM 18. The protected paper document creating unit 44 cooperates with the document ID encoding unit 45 and the printing unit 46, and creates a protected paper document to be printed by the printing unit 46, based on a protected electronic document. The document ID encoding unit 45 encodes document ID data included in the protected electronic document to image data which can be printed on paper. The printing unit 46 prints the created protected paper document. The document ID decoding unit 47 decodes read image data of a protected paper document which is read by the scanner 14 and extracts a document ID. The document ID creating unit 49 creates a document ID to be assigned to a newly created protected document. The controller 48 controls operations of the constituent elements, to realize cooperation with the hardware such as the scanner 14, and provides various functions related to policies such as attachment of a policy to a protected document which is newly created at the multifunction device 40, details of which will be described below.

The constituent elements 41-42 and 44-49 in the multifunction device 40 are realized by cooperation of a computer equipped in the multifunction device 40 and a program executed by the CPU 21 equipped in the computer. The image maintaining unit 43 is realized by the RAM 18.

The program used in the present exemplary embodiment may be provided by a communication unit or may be provided stored in a computer-readable storage medium such as a CD-ROM or a DVD-ROM. The program provided from the communication unit or storage medium is installed in the computer, and various processes are realized by the CPU of the computer sequentially executing the installed program.

Figure 9:
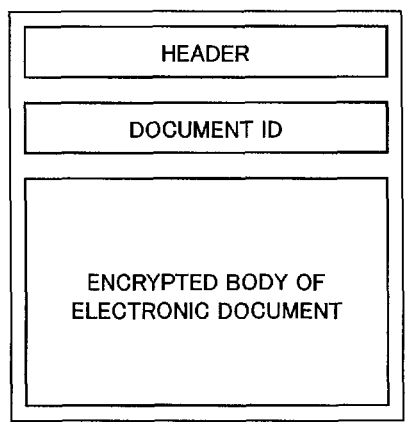
FIG. 9 is a diagram showing an example data structure of a protected electronic document used in a first exemplary embodiment according to the present invention.

FIG. 9 is a diagram showing an example data structure of a protected electronic document used in the present exemplary embodiment. The protected electronic document includes a header (a byte sequence of a predetermined length) showing that the data is a protected electronic document, a document ID, and an encrypted body of the electronic document. In the present exemplary embodiment, the protected electronic document is assumed to be encrypted with an encryption key common to all electronic documents, but such a configuration is only exemplary, and the key may be changed for each document such as in the DRM technique. In order to prevent intentional replacement of the document ID with a document ID of another document, an electronic signature may be attached to the overall electronic document, or a value such as HMAC (Keyed-Hashing for Message Authentication Code)

may be attached. In either case, in the present system, there is no further limitation other than that all protected documents are identified with identifiers, and that the protected documents are managed with policies.

Figure 10:
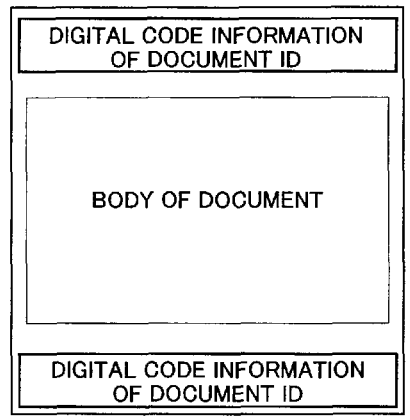
FIG. 10 is a schematic diagram showing an example when a protected paper document is printed on paper in a first exemplary embodiment according to the present invention.
Figure 11:
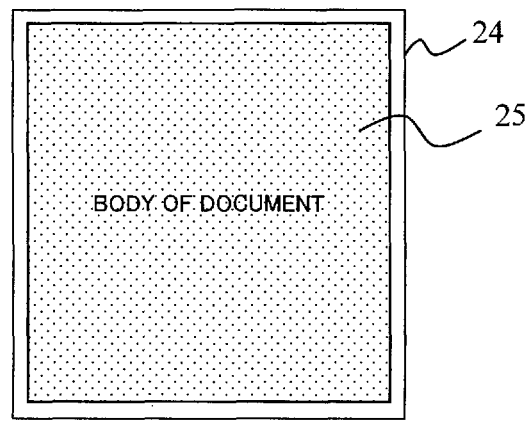
FIG. 11 is a schematic diagram showing another example when a protected paper document is printed on paper in a first exemplary embodiment according to the present invention.

FIGS. 10 and 11 are schematic diagrams showing examples when a protected paper document used in the present exemplary embodiment is printed on paper. FIG. 10 is an example of a case in which the document ID is printed in a specific code pattern such as a barcode and a QR code in upper and lower sections (header and footer) of the paper on which the document is printed. FIG. 11 shows a case in which the document ID is embedded through a watermark 25 as a background of the overall document on a printing medium 24 such as paper. In either case, it is sufficient as long as the document ID is printed on the paper itself in a method which enables reading of the document ID at a later time.

Next, an operation in the present exemplary embodiment will be described for each device in the order of the security policy server 30, the client PC 50, and the multifunction device 40.

1. Operation of Security Policy Server 30

The security policy server 30 provides 3 functions including registration, summary response, and search of security policy for the external devices 40 and 50. These processes will now be described.

1.1 Security Policy Registration

When the security policy registering unit 31 is called by the external device sending a registering request designating data necessary for registration from among a document ID, a derivation origin document ID, a policy ID, a document name, a media type, a user ID of a user who executed the operation to create the document, and a date and time of the creation operation, the security policy registering unit 31 adds the data in the document information database 36 as a new record. When a new document to be registered is created and a policy is attached, because there is no document which is a derivation origin, the registering request is sent without the derivation origin document ID. When, on the other hand, the document is created by derivation as a result of an operation on a document, the registering request includes the derivation origin document ID, but does not include a policy ID. When the creation date and time (operation date and time) of the document is not designated, the security policy registering unit 31 may set the current time when the data is registered in the document information database 36 as the operation date and time. Because the document name is an optional parameter, the document name does not need to be designated in the registering request. FIG. 12 shows an example registering request of the security policy sent from the external device.

1.2 Security Policy Summary Response

As described above, a security policy summary response is a function for an external device to request a summary list showing which policy can be attached, when the external device attaches a policy to the document.

When the security policy summary responding unit 32 is called by the external device sending a policy summary acquiring request, the security policy summary responding unit 32 searches policy data registered in the security policy database 35, creates a summary list of policies, and returns the summary list to the origin of the request. When the summary list cannot be created, the security policy summary responding unit 32 may respond accordingly ("FALSE").

When the external device sends a request to the security policy server 30, the user may request with a designation of a user ID or the like for which a policy is to be attached, as a request condition, so that the user can instruct that only the records matching the inquiry condition be included in the summary list. FIG. 13 shows an example summary list returned from the security policy summary responding unit 32 to the origin of the policy summary acquiring request.

1.3 Security Policy Search

Figure 14:
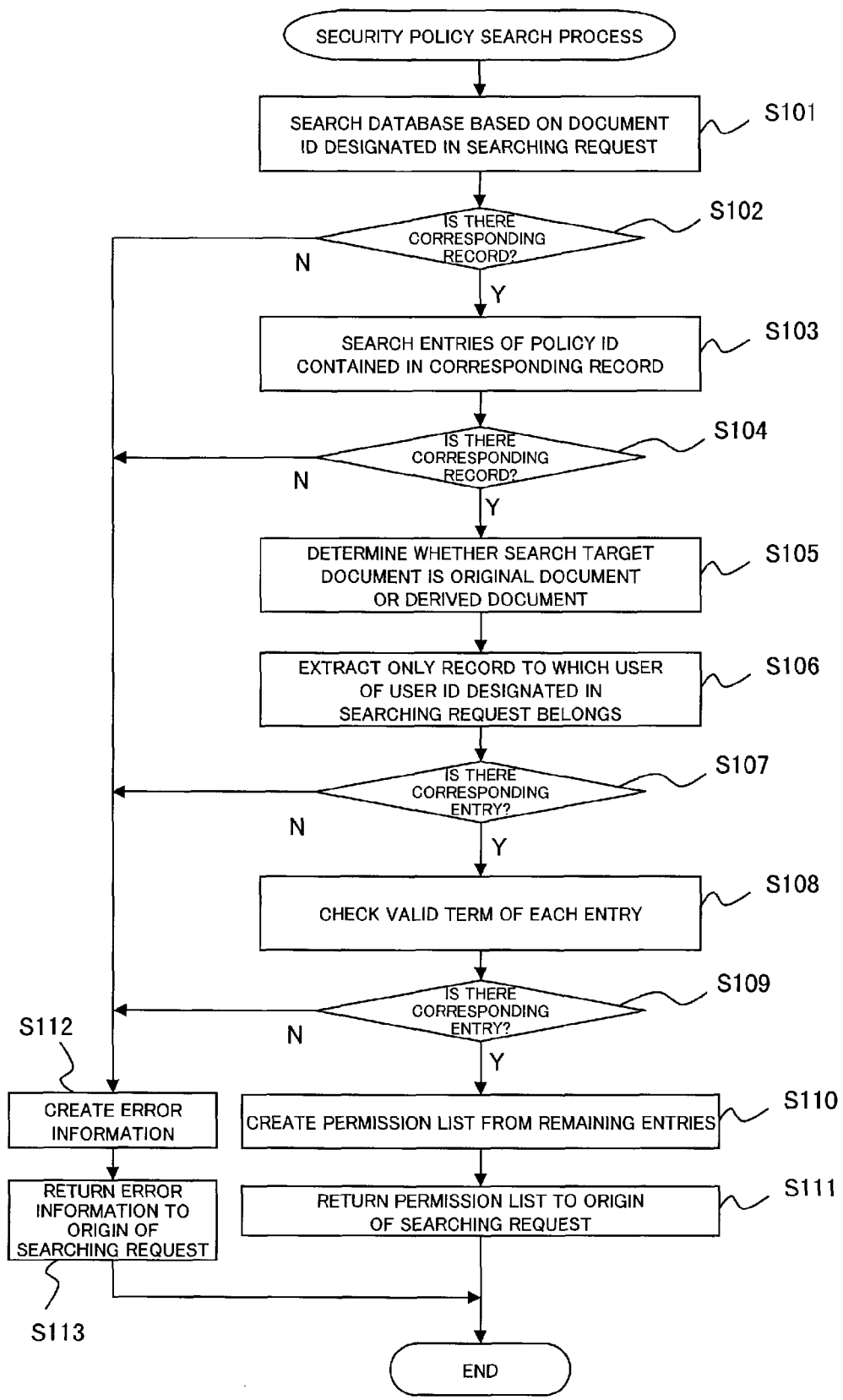
FIG. 14 is a flowchart showing a security policy search process in a first exemplary embodiment according to the present invention.

As described above, a security policy search is a function for the external device to request information of a security policy related to a document for which a policy is already set. The security policy search process will now be described with reference to a flowchart shown in FIG. 14.

When a security policy searching unit 33 is called by a searching request from an external device, the security policy searching unit 33 first searches the document information database 36 based on the document ID designated in the searching request (step 101). When a corresponding record is acquired (Y in step 102), the security policy searching unit 33 searches the security policy database 35 for an entry of the policy ID included in the record (step 103). Here, when no policy ID is set in the acquired record, the derivation origin document ID included in the record is traced until the policy ID is acquired. In this manner, when a policy ID is acquired (Y in step 104), the target document determining unit 34 in the security policy searching unit 33 refers to the record of the document ID registered in the document information database 36, and determines the type of the document; whether the document is an original document or a derived document (step 105). This determination can be made by determining the document to be an original document if there is a set policy ID in the record of the document ID or to be a derived document otherwise.

Because the entry of the policy of the document registered in the security policy database 35 is already identified in step 103, the security policy searching unit 33 refers to the usage range of the entry, and filters and extracts only the user group to which the user of the user ID designated in the searching request belongs (step 106). During this process, the security policy searching unit 33 refers, according to the determination result of the document type and in the subsequent processes, to an entry of the original document if the document is an original document or an entry of the derived document if the document is a derived document in the security policy database 35. Therefore, for example, when the inquiring user is not the creator and belongs to a software development section in the case where the document to be searched is a derived document and the policy ID is policy ID "0001" of FIG. 5, only the software development section in the derived document is extracted. The determination of whether or not a user is a creator is made by identifying the original document by tracing the derivation relationship of the designated document and determining whether or not the operator ID of the record of the document ID of the original document matches the user ID of the user transmitting the searching request. The determination of to which user group, such as the software development section, the user belongs can be made by referring to a user information database (not shown) which defines a correspondence relationship between the user group and the user belonging to the user group. In this manner, in the present exemplary embodiment, even when the document to be searched is a derived document, the creator of the original document is assumed to be the creator of the derived document. If nothing is found, a null (NULL) is returned.

When a user group to which the user belongs is extracted (Y in step 107), the valid term for each extracted entry is checked (step 108). In other words, for the item of the usage range of each an extracted entry, a valid term expiration date is created based on the creation date and time of the entry of the document ID. If the valid term expiration date is earlier than the current time, the entry is deleted from the extracted entries. If one or more entries remain (Y in step 109), a permission list is created (step 110). If only one entry remains, the entry is used as the permission list. When multiple entries remain, the permitted lists of the items of the remaining usage ranges are merged, to create a permission list. Regarding the valid term expiration date and time, the latest date and time is selected among the multiple entries.

The permission list thus created is returned to the external device transmitting the searching request as a search result (step 111). FIG. 15 shows an example policy search result returned to the origin of the searching request as a result of the above-described process. When there is no corresponding record or entry in the above-described process (N in step 102, N in step 104, N in step 107, or N in step 109), error information indicating that no record or entry is found is created (step 112), and returned to the external device transmitting the searching request (step 113).

In the example data structure of the security policy database 35 of FIG. 5, the target document is distinguished with two types, including the original document and the derived document. Therefore, with such a data structure, it is possible to easily achieve prohibition of creation of a derived document. In addition, in some cases, it may be desired to restrict the access rights for a document created by derivation. For example, when a human-resource related document is written as an electronic document and a manager collects the document, it is desirable, from a security viewpoint, for only the manager to be able to view the written electronic document. In other words, a document management may be employed in which the form of the original electronic document can be edited by all members of the group, but the derived document created as a result of editing and storing can only be viewed by the manager of the group. With the example data structure of FIG. 5, such a management can easily be realized.

In some management, it may be desirable to set different policies depending on the number of derivations such as between a case where a document is twice derived (a derived document is created, and another derived document is created with the derived document as a derivation origin document) and a case where a document is three-times derived. For example, there may be cases in which, for a certain paper document, copying of one generation is to be permitted but copying of second or later generations (that is, a copy of a copy) is not to be permitted. When the data is constructed as shown in FIG. 5, in which the target document is distinguished with two types including the original document and the derived document, because the same policy is uniformly applied to all derived document, the case in which it is desired to set different policies depending on the number of derivations cannot be handled. Therefore, in such a case, it is also possible to provide a number of derivations as a sub parameter of the target document, to enable application of different policies depending on the number of derivations of the document.

In addition, derivation from a document includes a case in which multiple documents are created from one document by derivation (multiple copies of one document) and a case in which documents are created through a chain of derivations from one document (copy of a copy of one document). It is also possible to employ a configuration to allow application of different policies depending on the type of derivation. A depth of the derivation can be easily determined by counting the number of traces to the derivation origin document ID, until the trace reaches the record in which the policy ID is set in the document information database 36.

2. Operation of Client PC 50

The client PC 50 executes an operation such as protection of an electronic document and editing and printing within a scope of right permitted in the policy on a protected electronic document, through execution of a predetermined document processing application. The processes such as printing and editing of a non-protected document are similar to those in the related art, and will not be described here.

2.1 Creation of Protected Electronic Document

Figure 16:
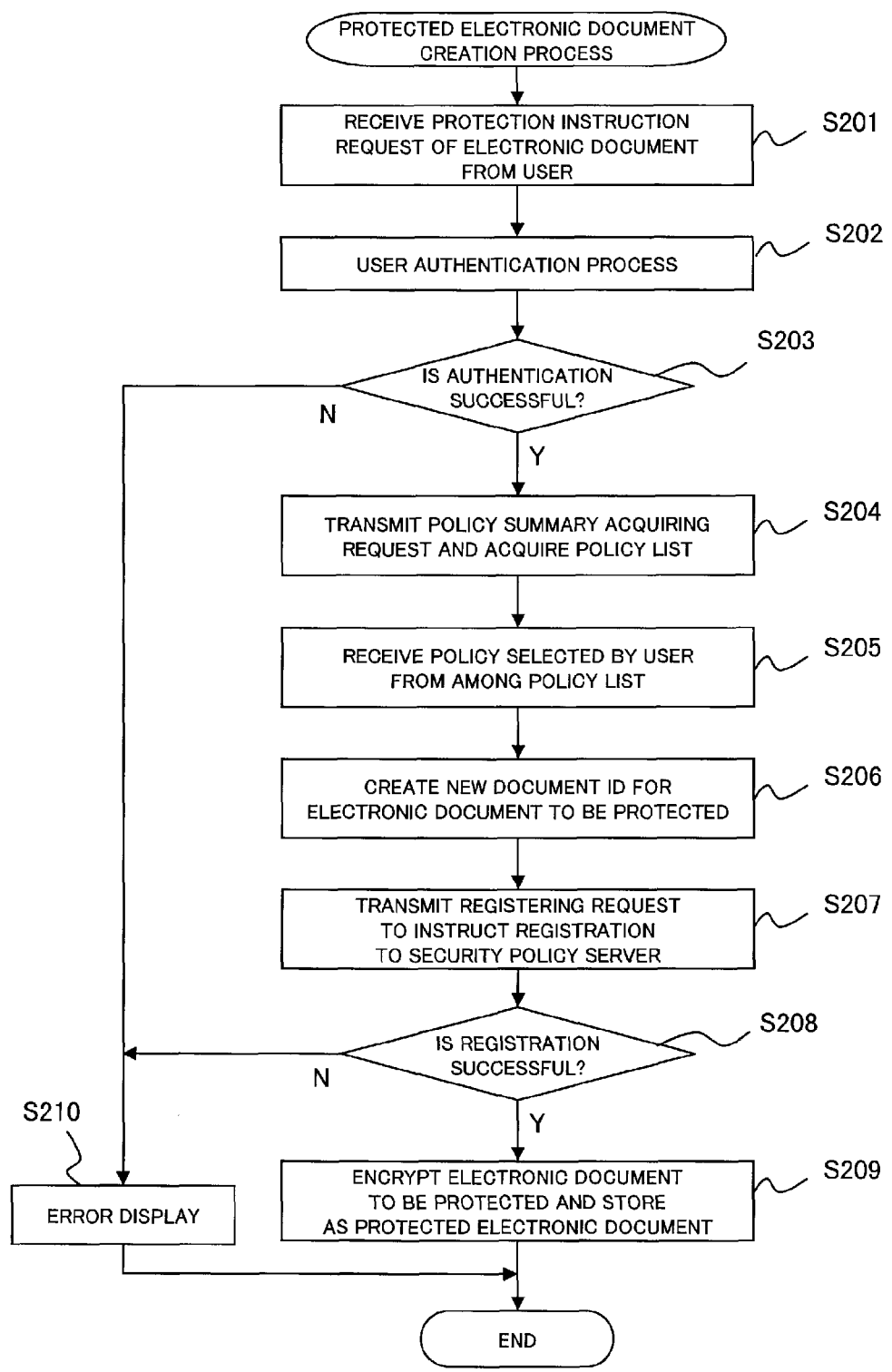
FIG. 16 is a flowchart showing a creation process of a protected electronic document in a client PC in a first exemplary embodiment according to the present invention.

A creation process of a protected electronic document will now be described with reference to a flowchart shown in FIG. 16.

When a user who is using the client PC 50 inputs a protection instructing request designating an electronic document which is not protected, using an inputting unit such as a keyboard 7, the controller 61 receives the request (step 201). When a user ID and a password which are input when the user logs in the client PC 50 or a user ID and a password which are input by the user in response to a separate inputting request are sent to the user authenticating unit 59, the user authenticating unit 59 checks whether or not the input information is correct by inquiring to the external user authentication server 23 (step 202). When the user authentication is successful (Y in step 203), the user ID is maintained. When the user authentication fails (N in step 203), on the other hand, the failure is displayed on the display 8 (step 210) and the process is terminated.

After the user authentication is successful, the controller 61 instructs the document maintaining unit 57 to maintain the non-protected electronic document by registering in the document maintaining unit 57, and calls the protected electronic document creating unit 54. The protected electronic document creating unit 54 transmits a policy summary acquiring request to the security policy server 30, to acquire a list of security policies (step 204). The processes executed on the side of the security policy server 30 in response to the transmitted policy summary acquiring request have already been described in "1.2 Security Policy Summary Response". When a summary list of the policy is acquired, the controller 61 instructs the document displaying unit 58 to display the acquired summary list of policy in a format which can be understood by the user (for example, a list display by a drop-down of policy name), and allows the user to select a policy to be applied. When a policy is selected, the controller 61 receive the selection (step 205), and then the protected electronic document creating unit 54 instructs the document ID creating unit 55 to create a document ID (step 206), creates a registering request including parameters of the document ID, a policy ID, a user ID (operator ID), a media type (here, "electronic"), creation date and time (current time), and operation (here, "create"), and transmits the registering request to the security policy server 30, to instruct registration of the protected electronic document (step 207). The processes executed on the side of the security policy server 30 in response to the transmitted registering request have already been described in "1.1 Security Policy Registration".

When it is recognized that the registration process is successful based on a processing result returned from the security policy server 30 in response to the registering instruction (Y in step 208), the controller 61 encrypts the non-protected document with a predetermined encryption key, correlates the assigned document ID, and writes and stores in the protected electronic document storage 53 as a protected electronic document (step 209).

When the authentication fails (N in step 203) or failure of the registration process is returned from the security policy server 30 (N in step 208), the controller 61 notifies the user by, for example, displaying error information on the display 8 (step 210).

2.2 View of Protected Electronic Document

Figure 17:
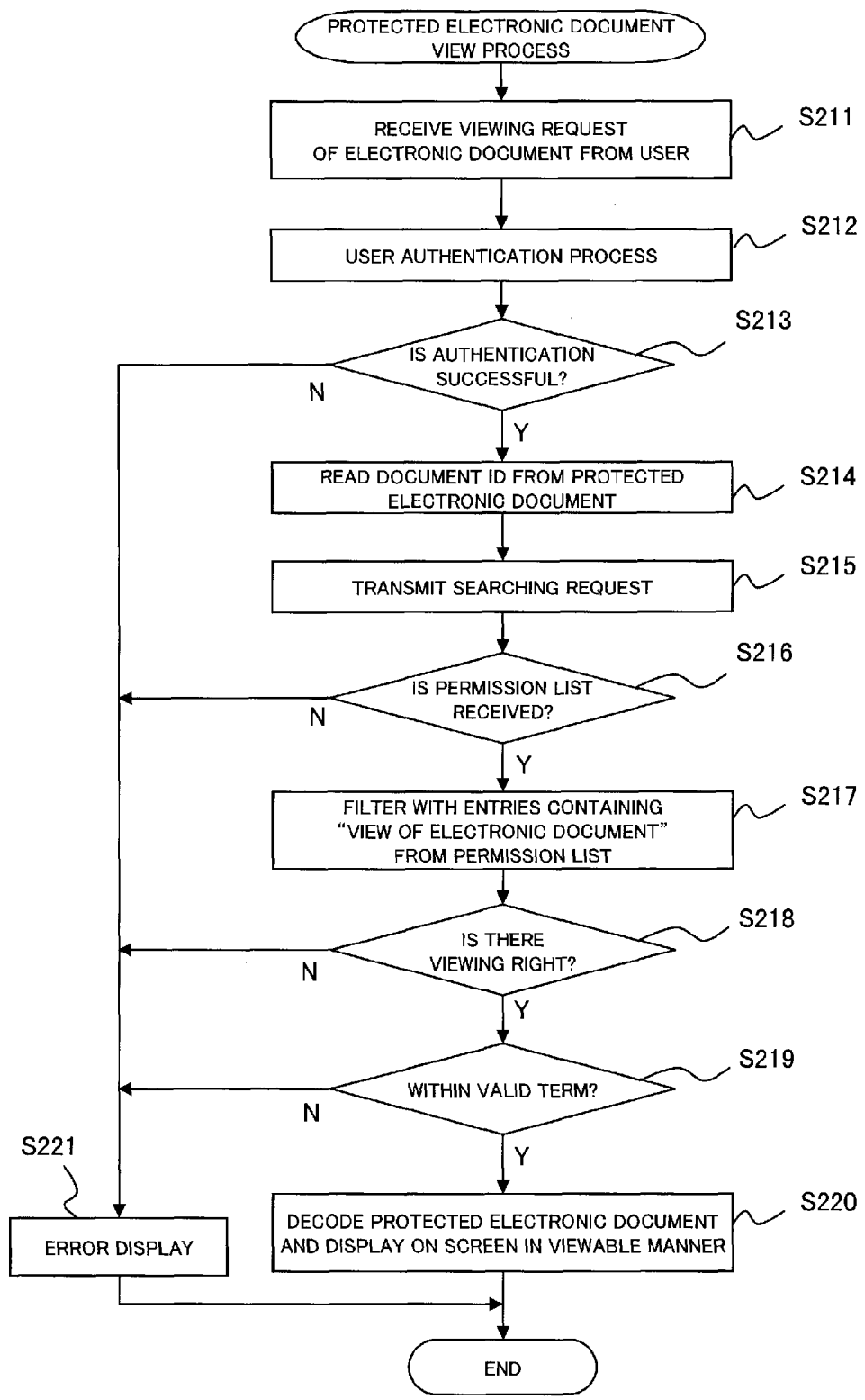
FIG. 17 is a flowchart showing a view process of a protected electronic document in a client PC in a first exemplary embodiment according to the present invention.

Next, a view process of the protected electronic document will be described with reference to a flowchart shown in FIG. 17.

A user who is using the client PC 50 starts up a document processing application designating a protected electronic document using an inputting unit such as the keyboard 7 to view of the protected electronic document. When viewing of a protected electronic document is requested in response to this user operation, the controller 61 receives the request (step 211), and instructs the user authenticating unit 59 to execute user authentication, similar to the protected electronic document creation process (step 212). After the user authentication is successful (Y in step 213), the controller 61 reads the document ID of the designated protected electronic document from the protected electronic document storage 53 (step 214), creates a searching request including parameters of the document ID and the user ID used for the user authentication, and transmits the request to the security policy server 30 (step 215). The processes executed on the side of the security policy server 30 in response to the transmitted searching request have already been described in "1.3 Security Policy Search".

When error information indicating, for example, that there is no search result is transmitted from the security policy server 30 in response to the searching request (N in step 216), the controller 61 displays an error message such as "you do not have an access right for the designated document" on the display 8 and completes the process (step 221). When, on the other hand, the permission list is transmitted from the security policy server 30 as a search result (Y in step 216), the controller 61 refers to the permission list and filters the list with only the entries containing "view of electronic document" (step 217). In the example configuration of FIG. 15, only the entries containing "View" in the Operation tag are extracted. In addition, when the permission list is created by merging permitted function lists, the presence/absence of "View" is checked. If the "View" is not contained (N in step 218), it is determined that the viewing right for the designated protected electronic document is not attached to the user, and an error that "you do not have viewing right for designated document" is displayed on the display 8 (step 221).

When, on the other hand, "View" is contained (Y in step 218), the controller 61 then refers to the search result remaining through the filtering process, and checks whether or not there is an entry in which the valid term has not expired. Because the security policy server 30 is configured to not return the entries for which the valid term has expired, this process functions as a double-checking process. When there is no entry for which the valid term has not expired (N in step 219), an error message that "valid term for the right for designated document has expired" is displayed and the process is completed (step 221).

When, on the other hand, there is an entry in which the valid term has not expired (Y in step 219), it is determined that the user has a viewing right, and the controller 61 decodes the body of the document with a predetermined decoding key, temporarily stores the decoded result along with the document ID in the document maintaining unit 57, calls the document displaying unit 58, and instructs the document to be displayed on the display 8 (step 220).

2.3 Edit of Protected Electronic Document

Figure 18:
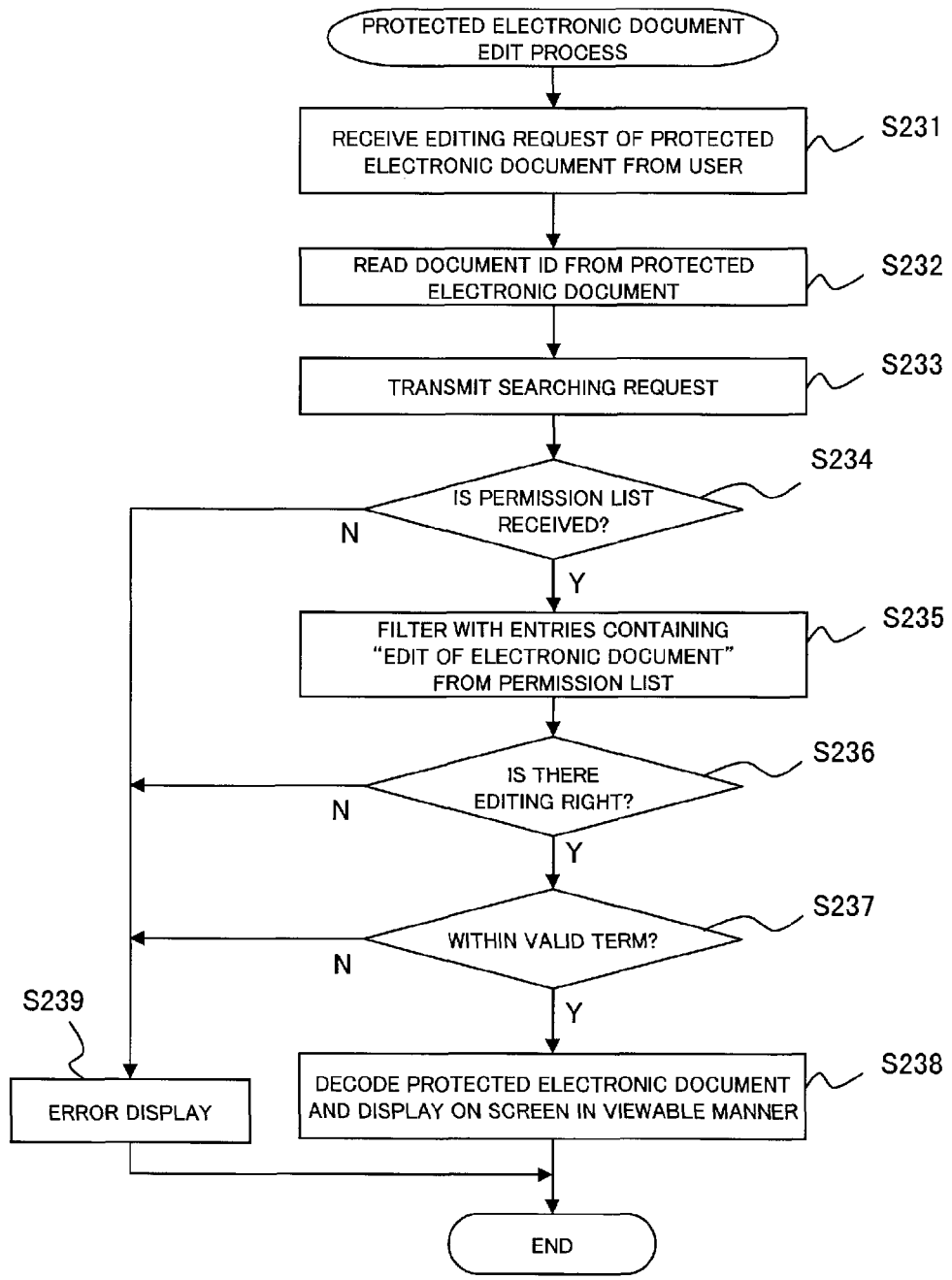
FIG. 18 is a flowchart showing an edit process of a protected electronic document in a client PC in a first exemplary embodiment according to the present invention.

Next, an editing process of a protected electronic document will be described with reference to a flowchart shown in FIG. 18. Here, it is assumed that the document is already opened with a document processing application during editing. In other words, the editing process to be described below starts at a state in which a viewing process is executed and a document is already read to the document maintaining unit 57.

When editing of a protected electronic document is requested by a user opening the protected electronic document in the client PC 50, the controller 61 receives the request (step 231). The controller 61 reads the document ID from the protected electronic document (step 232), creates a searching request including parameters of the document ID and the user ID which is used for the user authentication, and transmits the request to the security policy server 30 (step 233). The processes executed on the side of the security policy server 30 in response to the transmitted searching request have already been described in "1.3 Security Policy Search".

When error information such as indication that there is no search result is sent from the security policy server 30 in response to the searching request (N in step 234), the controller 61 displays an error message such as "you do not have access right for the designated document" on the display 8 and completes the process (step 239). When, on the other hand, a permission list is sent from the security policy server 30 as a search result (Y in step 234), the controller 61 refers to the permission list and filters the list with only the entries that contain "edit of electronic document" (step 235). In the example configuration of FIG. 15, only the entries that contain "Edit" in the Operation tag are extracted. When the permission list is created by merging permitted function lists, the presence/absence of "Edit" is checked. Here, if "Edit" is not contained (N in step 236), it is determined that an editing right for the designated protected electronic document is not attached to the user, and an error stating that "you do not have editing right for the designated document" is displayed on the display 8 (step 239).

When "Edit" is contained (Y in step 236), the controller 61 next refers to the search result remaining after the filtering process and checks whether or not there is a policy for which the valid term has not expired. Because the security policy server 30 is configured to not return policies for which the valid term has expired, this process functions as a double-check process. If there is no policy for which the valid term has not expired (N in step 237), an error message that "valid term of right for designated document has expired" is displayed and the process is completed (step 239).

When there is a policy for which the valid term has not expired (Y in step 237), it is determined that the user has an editing right, and the controller 61 calls the document editing unit 56 and permits editing of the protected electronic document to the user (step 238).

Alternatively, a configuration may be employed in which, when policy of the protected electronic document is requested from the security policy server 30 when the document is opened (viewed), the result of the request is maintained in the RAM 3. With such a configuration, the request of permission list in step 233 is not necessary, and the policy maintained in the RAM 3 may be referred to.

2.4 Print of Protected Electronic Document

Figure 19:
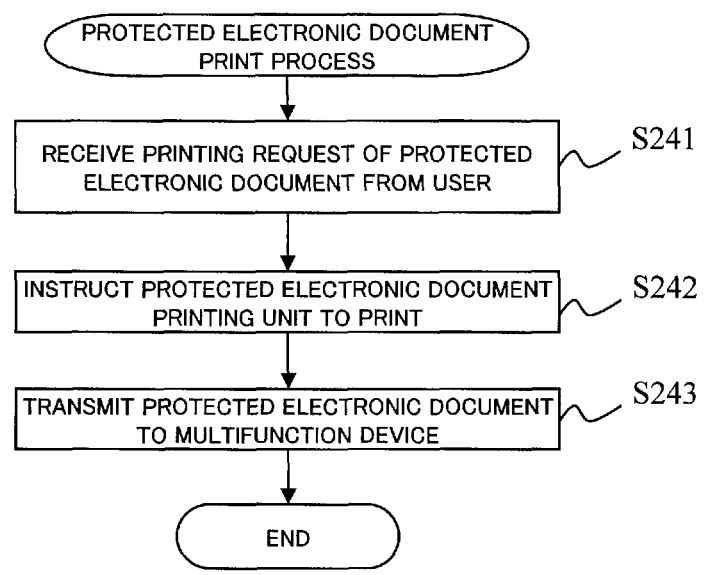
FIG. 19 is a flowchart showing a print process of a protected electronic document in a client PC in a first exemplary embodiment according to the present invention.

Next, a printing process of a protected electronic document will be described with reference to a flowchart shown in FIG. 19. During printing, it is assumed that the document is already opened by a document application, similar to the case of editing. In other words, the printing process to be described below starts from a state in which the viewing process is executed and a document is already read in the document maintaining unit 57.

When a user opening a protected electronic document in the client PC 50 requests printing of the protected electronic document, the controller 61 receives the printing request (step 241), and sends a printing instruction of the protected electronic document designated by the user to the protected document printing unit 60 (step 242). The protected document printing unit 60 receiving the printing instruction reads the protected electronic document maintained in the document maintaining unit 57, converts the read document into a print image, and instructs the multifunction device 40 designated by the user to print the document by transmitting the protected electronic document along with the document ID and the user ID (step 243). The multifunction device 40 starts a printing process when the multifunction device 40 receives the protected electronic document. This process will be described later.

Figure 20:
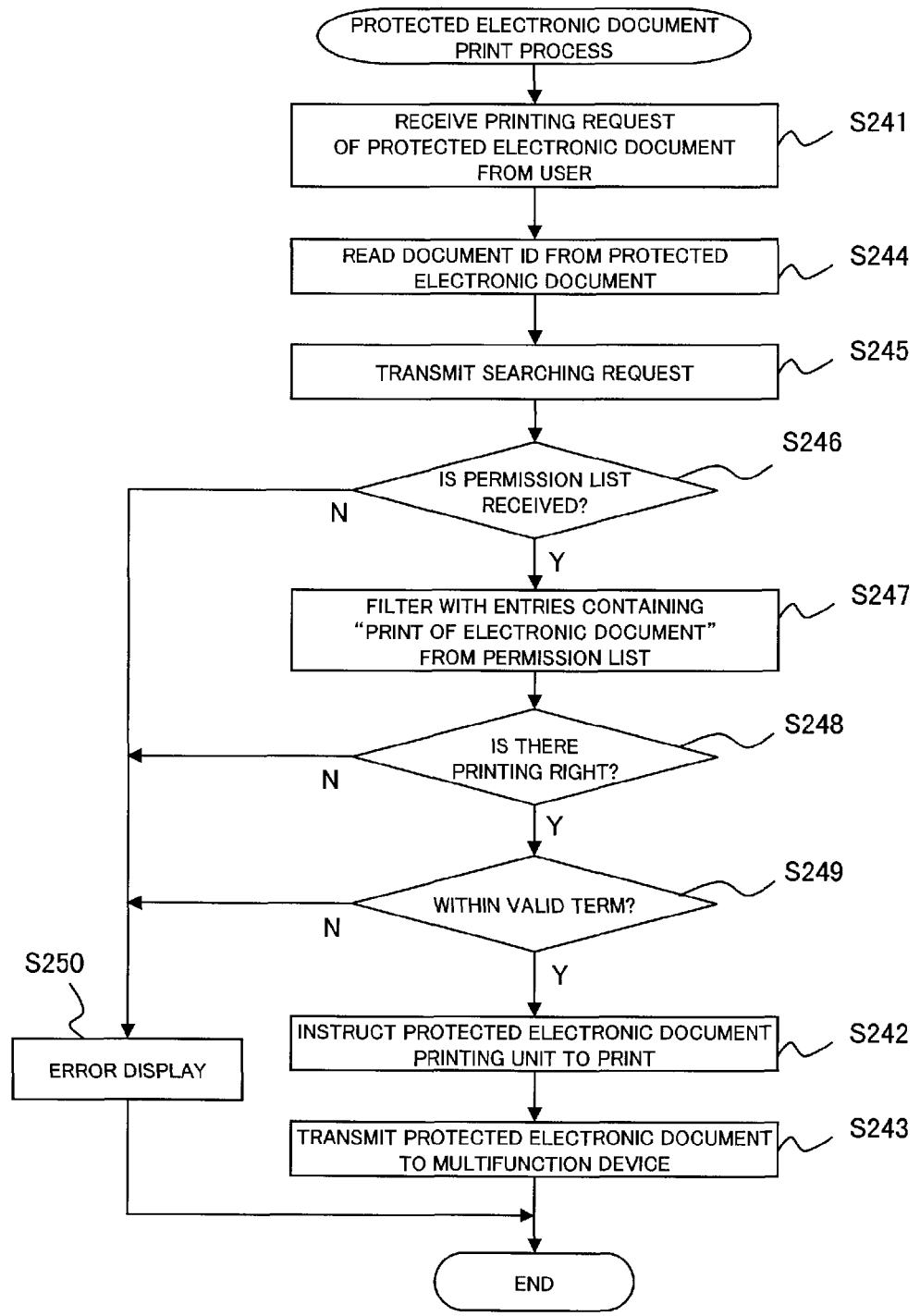
FIG. 20 is a flowchart showing a print process of a protected electronic document when a right is checked in a client PC in a first exemplary embodiment according to the present invention.

In the present exemplary embodiment, because the checking of the right to allow or not allow execution of the printing process is executed on the side of the multifunction device 40, the document processing application side does not need to check the right. However, with such a configuration, the presence/absence of a printing right can be checked only after the document data is sent to the multifunction device 40, and, thus the data communication from the client PC 50 to the multifunction device 40 may sometimes be wasteful. In consideration of this, in the present exemplary embodiment, it is also possible to employ a configuration in which it is checked, before the document data is transmitted, as to whether or not the user has the printing right for the document to be transmitted. A right checking process executed on the side of the client PC 50 during the printing process will now be described with reference to a flowchart shown in FIG. 20. Processes identical to those in FIG. 19 are assigned the same step numbers.

When a user opening a protected electronic document in the client PC 50 requests printing of a protected electronic document, the controller 61 receives the printing request (step 241). The controller 61 reads the document ID from the protected electronic document to be printed (step 244), creates a searching request including various parameters including the document ID and the user ID which is used for the user authentication, and transmits the request to the security policy server 30 (step 245). The processes executed on the side of the security policy server 30 in response to the transmitted searching request have already been described in "1.3 Security Policy Search".

Here, if error information such as information indicating that there is no search result is sent from the security policy server 30 in response to the searching request (N in step 246), an error message such as "you do not have printing right for designated document" is displayed on the display 8, and the process is completed (step 250). When, on the other hand, the permission list is sent from the security policy server 30 as a search result (Y in step 246), the controller 61 refers to the permission list, and filters the list with only the entries containing "printing of electronic document" (step 247). In the example configuration of FIG. 15, only the entries containing "Print" in the Operation tag are extracted. When the permission list is created by merging permitted function lists, the presence/absence of "Print" is checked. Here, if the "Print" is not contained (N in step 248), it is determined that a print right for the designated protected electronic document is not attached to the user, and an error stating that "you do not have printing right for designated document" is displayed on the display 8 (step 250).

When "Print" is contained (Y in step 248), the controller 61 then refers to the search result remaining after the filtering process, and checks whether or not there is a policy for which the valid term has not expired. Because the security policy server 30 is configured to not return a policy for which the valid term has expired, this process functions as a double-checking process. If there is no policy for which the valid term has not expired (N in step 249), an error message of "valid term of right for designated document has expired" is displayed and the process is completed (step 250).

If there is a policy for which the valid term has not expired (Y in step 249), the user is determined to have the printing right, and the controller 61 sends a printing instruction of the protected electronic document designated by the user to the protected document printing unit 60 (step 242). In response to the printing instruction, the protected document printing unit 60 reads the protected electronic document maintained in the document maintaining unit 57, converts the document into a print image, and instructs the multifunction device 40 designated by the user to print by transmitting the protected electronic document along with the document ID and the user ID (step 243).

2.5 Storage of Protected Electronic Document

In the present embodiment, two types of storage methods including a "temporary storage" and "fixed storage" are provided for the user when a protected electronic document which is opened by the document processing application is stored (overwritten, renamed) in a file.

The "temporary storage" is a storage method which does not execute a deriving process. In other words, this process is employed when an editor of the document wishes to store the edited content without managing the edited document as a derived document of the document before editing. In the present embodiment, a document is set as a management target by storing the information related to the original document and the derived document using the document information database 36. However, when the "temporary storage" is selected, the edited content for the document is set as an exemption of the management of the system, and the edited document can be stored in a state of individual usage. Therefore, the policy of the original document is carried on as the policy of the temporarily stored document. The "temporary storage" is employed, for example, when it is desired to temporarily internally store a form which is being edited and which is not yet completed.

The "fixed storage", on the other hand, is a method of storing the edited document as a derived document. In other words, the stored document is stored not as an original document, but as a derived document of the document before editing. Because of this, the policy of the derived document is applied as the policy of the fixedly stored document. The "fixed storage" is used, for example, when the content is to be fixed because the form is completed.

If the temporarily stored document is opened using the document processing application and fixedly stored, the information related to the document is registered in the document information database 36, and the document is managed as a derived document.

Figure 21:
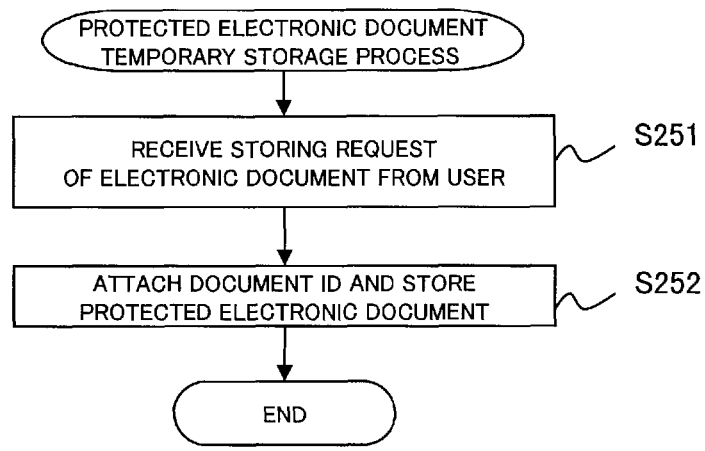
FIG. 21 is a flowchart showing a temporary storage process of a protected electronic document in a client PC in a first exemplary embodiment according to the present invention.

The temporary storage process of the protected electronic document will first be described with reference to a flowchart of FIG. 21.

First, when a user selects temporary storage through clicking a predetermined temporary storage button on the document processing application or the like, the controller 61 receives the storing request corresponding to the user operation (step 251). The controller 61 determines that the electronic document is a protected electronic document if a document ID is assigned to the electronic document stored in the document maintaining unit 57, encrypts the body of the document with a predetermined encryption key, attaches a document ID, and stores the protected electronic document file in the protected electronic document storage 53 (step 252).

Figure 22:
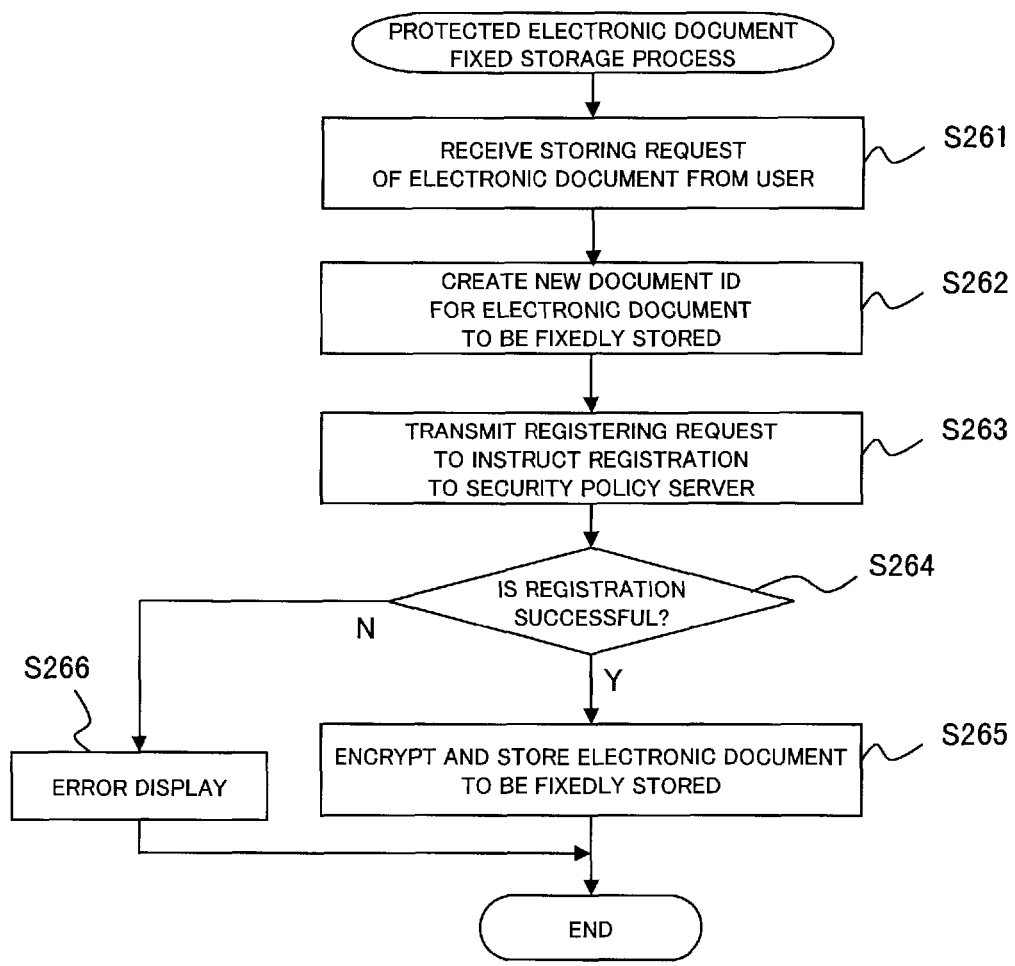
FIG. 22 is a flowchart showing a fixed storage process of a protected electronic document in a client PC in a first exemplary embodiment according to the present invention.

Next, a fixed storage process of the protected electronic document will be described with reference to a flowchart of FIG. 22. In the fixed storage process, because a document is derived during storage of a document, a document ID must be reassigned when the document file is created, before the document is registered in the document information database 36.

When a user selects fixed storage through clicking a predetermined fixed storage button on the document processing application or the like, the controller 61 receives the storing request corresponding to the user operation (step 261). The controller 61 determines that the electronic document is a protected electronic document if a document ID is assigned to the electronic document stored in the document maintaining unit 57, instructs the document ID creating unit 55 to create a document ID (step 262), creates a registering request including parameters of the document ID of the origin document (derivation origin document ID), the newly created document ID, the user ID (operator ID), a media type (here, "electronic"), date and time of creation (current date and time), and operation (here, "edit"), and transmits the registering request to the security policy server 30, to instruct registration of the protected electronic document (step 263). The processes executed on the side of the security policy server 30 in response to the transmitted registering request have already been described in "1.1 Security Policy Registration". In addition, the document ID of the electronic document stored in the document maintaining unit 57 is replaced with the newly created document ID.

When the controller 61 recognizes that the registration process is successful based on a processing result which is returned from the security policy server 30 in response to the registering request (Y in step 264), the controller 61 encrypts a non-protected document with a predetermined encryption key, correlates the assigned document ID, and writes and stores in the protected electronic document storage 53 as a protected electronic document (step 265).

When an indication of failure of the registration process is returned from the security policy server 30 (N in step 264), the controller 61 notifies the user of the failure by, for example, displaying error information on the display 8 (step 266).

In the storage of the protected electronic document described above, the authority for the operation to store the document may be considered as an independent authority similar to the operations such as printing and copying. In this case, the document processing application checks the right before the storage process is executed, similar to the case of the editing process.

3. Operation of Multifunction Device 40

The multifunction device 40 provides services such as printing of the protected electronic document and copying and scanning of a protected paper document. Here, with regard to copying and scanning of the normal paper document other than the protected paper document, the description is omitted because the process is similar to that in the related art.

3.1 Print of Protected Electronic Document

Figure 23:
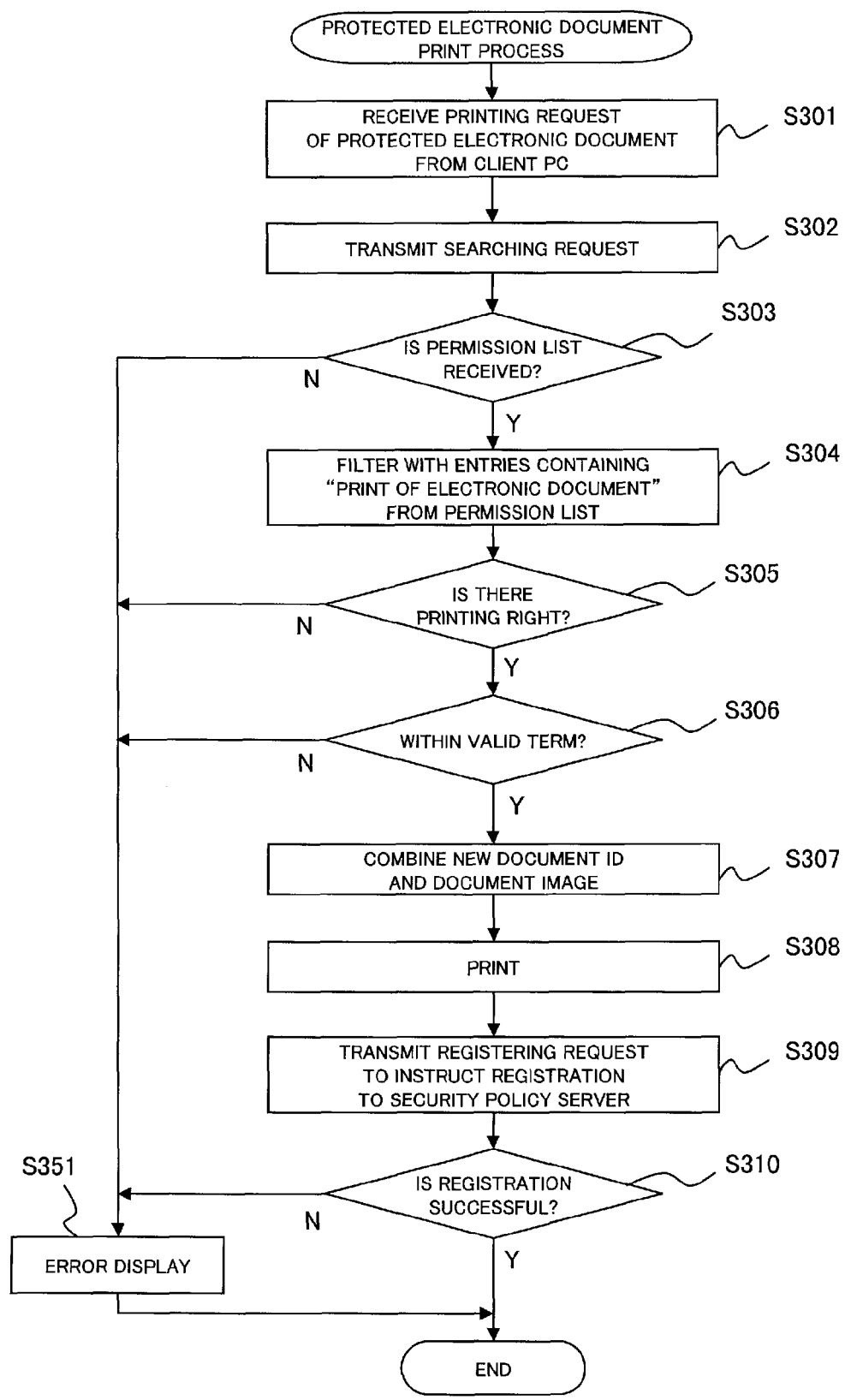
FIG. 23 is a flowchart showing a print process of a protected electronic document in a multifunction device in a first exemplary embodiment according to the present invention.

A printing process of a protected electronic document will now be described with reference to a flowchart shown in FIG. 23.

As described above in "2.4 Print of Protected Electronic Document", when the user requests printing of a protected electronic document, the print image which can be printed in the multifunction device 40 is sent along with the document ID and user ID from the client PC 50 to the multifunction device 40. When the controller 48 receives the printing request (step 301), the controller 48 creates a searching request including various parameters including the document ID and the user ID included in the printing request, and transmits the request to the security policy server 30 (step 302). The processes executed on the side of the security policy server 30 in response to the transmitted searching request have already been described in "1.3 Security Policy Search".

Here, when error information such as indication that there is no search result is sent from the security policy server 30 in response to the searching request (N in step 303), the controller 48 displays an error message such as "you do not have printing right for designated document" on the operation panel 13 or records an error log in the HDD 15, and completes the process (step 309). When, on the other hand, a permission list is sent from the security policy server 30 as a search result (Y in step 303), the controller 48 refers to the permission list, and filters with only the entries containing "printing of electronic document" (step 304). In the example configuration of FIG. 15, only entries containing "Print" in the Operation tag are extracted. When the permission list is created by merging permitted function lists, the presence/absence of "Print" is checked. If "Print" is not contained (N in step 305), it is determined that the printing right for the designated protected electronic document is not attached to the user, and an error such as "you do not have printing right for designated document" is displayed on the operation panel 13 (step 351).

When "Print" is contained (Y in step 305), the controller 48 refers to the search result remaining after the filtering process, and checks whether or not there is a policy for which the valid term has not expired. Because the security policy server 30 is configured to not return policies for which the valid term has expired, this process functions as a double-checking process. When there is no policy for which the valid term has not expired (N in step 306), an error message such as "valid term of right for designated document has expired" is displayed and the process is completed (step 351).

On the other hand, if there is a policy for which the valid term has not expired (Y in step 306), the user is determined as having the printing right, and the controller 48 temporarily stores the print image, document ID, and user ID in the image maintaining unit 43, and calls the protected paper document creating unit 44. The protected paper document creating unit 44 instructs the document ID creating unit 49 to create a new document ID and instructs the document ID encoding unit 45 to convert the created document ID into a picture image of a code pattern such as a barcode. The protected paper document creating unit 44 combines the picture image of the document ID in the header and/or footer of the print image of the protected electronic document to be printed, to create a combined image to be printed (step 307). The printing unit 46 then prints the created combined image (step 308). FIG. 10 is a schematic diagram of paper when the protected electronic document is printed in this manner. Alternatively, it is possible to create a watermark of the document ID and print in a manner exemplified in FIG. 11.

Then, the controller 48 creates a registering request including parameters of the document ID of the origin document (derivation origin document ID), the newly created document ID, a user ID (operator ID), a media type (here, "paper"), creation date and time (current date and time), and an operation (here, "print"), and transmits the request to the security policy server 30 to instruct registration of the protected electronic document (step 309). The processes executed on the side of the security policy server 30 in response to the transmitted registering request have already been described in "1.1 Security Policy Registration".

Here, the normal completion of the process is confirmed by recognizing that the registration process is successful based on a processing result returned from the security policy server 30 in response to the registering instruction (Y in step 310). When, on the other hand, an indication of failure of the registering process is returned from the security policy server 30 (N in step 310), the controller 48 displays error information on the operation panel 13 or records an error log in the HDD 15, and completes the process (step 351).

3.2 Copy of Protected Paper Document

Figure 24:
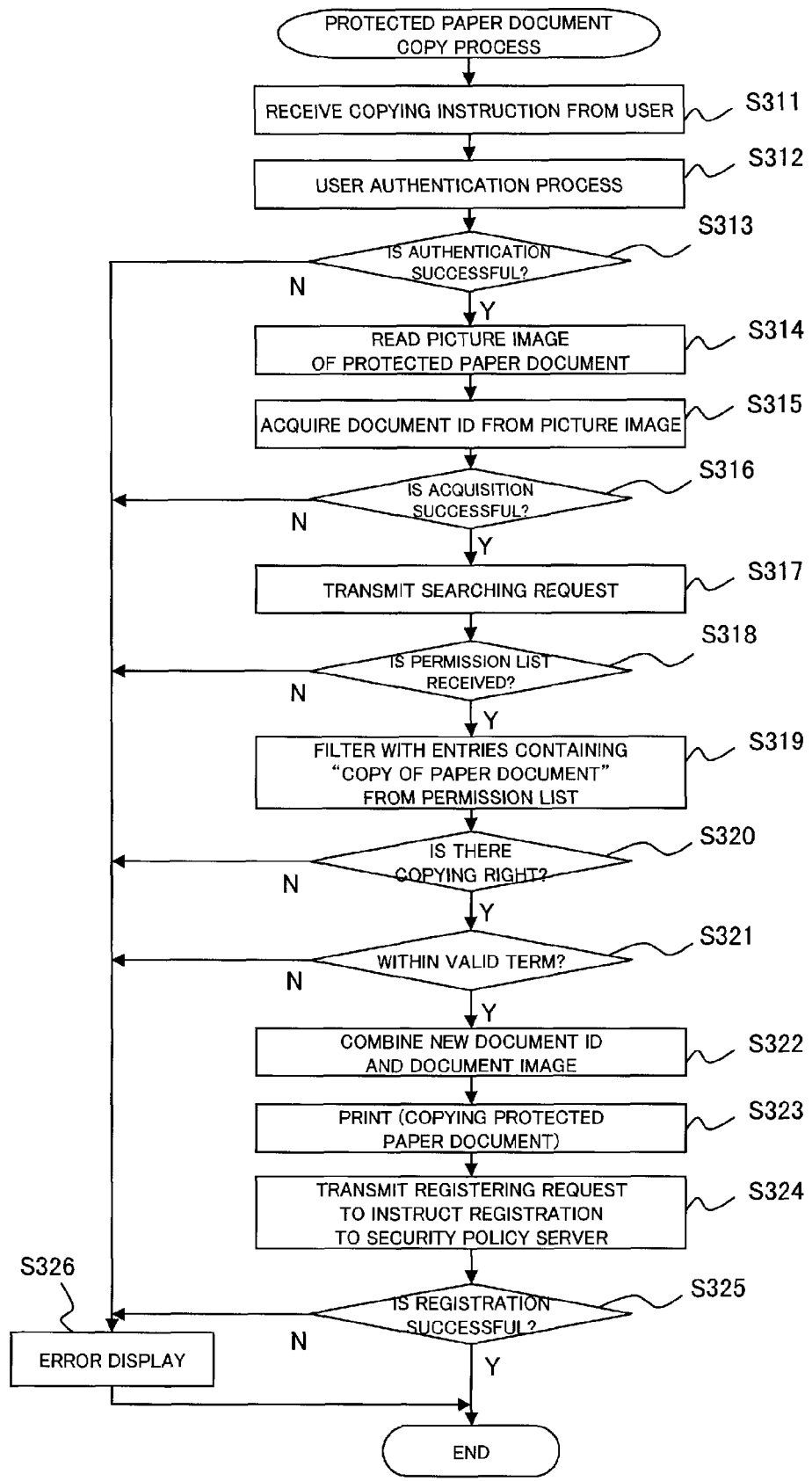
FIG. 24 is a flowchart showing a copy process of a protected paper document in a multifunction device in a first exemplary embodiment according to the present invention.

A copying process of a protected paper document will now be described with reference to a flowchart shown in FIG. 24.

A user places the protected paper document on a platen of the multifunction device 40 or on an ADF (Auto Document Feeder), and presses a button of "copy protected document" displayed on the operation panel 13. When the controller 48 receives the copying instruction by the pressing operation of the user (step 311), the controller 48 displays a user authentication dialog on the operation panel 13, to ask the user for an input of the user ID and the password. When the user inputs the user ID and password, the input user ID and password are sent to the user authenticating unit 41. The user authenticating unit 41 checks whether or not the input information is correct by inquiring to the external user authentication server 23 (step 312). When the user authentication is successful (Y in step 313), the user ID is maintained. When the user authentication fails (N in step 313), the failure is displayed on the operation panel 13 (step 326), and the process is terminated.

After the user authentication is successful, the controller 48 scans the protected paper document and reads an image (step 314), and instructs the document ID decoding unit 47 to decode the picture image in the header and footer of the picture image, to acquire the document ID (step 315). When the document ID is incorporated in the protected paper document by watermarking, the watermark is decoded. When the decoding of the document ID fails and the document ID is not acquired (N in step 316), the failure is displayed on the operation panel 13 (step 326), and the process is terminated.

When decoding of the document ID is successful (Y in step 316), the controller 48 creates a searching request including various parameters including the decoded document ID and user ID which is used for the user authentication, and transmits the request to the security policy server 30 (step 317). The processes executed on the side of the security policy server 30 in response to the transmitted searching request have already been described in "1.3 Security Policy Search".

Here, if error information such as information indicating that there is no search result is sent from the security policy server 30 in response to the searching request (N in step 318), the controller 48 displays an error message such as "you do not have copying right" on the operation panel 13 and the process is completed (step 326). When, on the other hand, the permission list is sent from the security policy server 30 as a search result (Y in step 318), the controller 48 refers to the permission list, and filters with only the entries containing "copying of paper document" (step 319). In the example configuration of FIG. 15, only the entries containing "Copy" in the Operation tag are extracted. When the permission list is created by merging permitted function lists, the presence/absence of "Copy" is checked. When "Copy" is not contained (N in step 320), it is determined that the copying right for the designated protected electronic document is not attached for the user, and an error such as "you do not have copying right" is displayed on the operation panel 13 and the process is completed (step 326).

When "Copy" is contained (Y in step 320), the controller 48 then refers to the search result remaining after the filtering process, and checks whether or not there is a policy for which the valid term has not expired. Because the security policy server 30 is configured to not return the policies for which the valid term is expired, this process functions as a double-checking process. When there is no policy for which the valid term has not expired (N in step 321), an error message of "valid term for right has expired" is displayed and the process is completed (step 326).

When there is a policy for which the valid term has not expired (Y in step 321), the user is determined as having the copying right, and the controller 48 temporarily stores the print image, document ID, and user ID in the image maintaining unit 43, and calls the protected paper document creating unit 44. The protected paper document creating unit 44 instructs the document ID creating unit 49 to create a new document ID and instructs the document ID encoding unit 45 to convert the newly created document ID into a picture image of a code pattern such as a barcode. The protected paper document creating unit 44 combines the image of the document ID into the header and/or footer of the print image of the protected electronic document to be printed, to create a combined image to be printed (step 322). Then, the printing unit 46 prints the created combined image (step 323). FIG. 10 is a schematic view showing the paper when the protected electronic document is printed in this manner. When the document ID is formed as a watermark in the protected paper document to be copied, the document ID is printed as a watermark 25, as shown in FIG. 11. The protected paper document is copied in this manner. In the present exemplary embodiment, in particular, the read image of the document ID is not simply copied and printed, but rather, is decoded once and then encoded again during printing of the copy, and thus the document ID data printed on the paper document is not degraded.

Then, the controller 48 creates a registering request including parameters of the document ID of the origin document (derivation origin document ID), the newly created document ID, a user ID (operator ID), a media type (here, "paper"), creation date and time (current date and time), and an operation (here, "copy"), and transmits the request to the security policy server 30 to instruct registration of the protected electronic document (step 324). The processes executed on the side of the security policy server 30 in response to the transmitted registering request have already been described in "1.1 Security Policy Registration".

Here, a normal completion of the process is confirmed by recognizing that the registration process is successful based on a processing result returned from the security policy server 30 in response to the registering instruction (Y in step 325). When, on the other hand, an indication of failure of the registration process is returned from the security policy server 30 (N in step 325), the controller 48 displays error information on the operation panel 13 or records an error log in the HDD 15, and completes the process (step 326).

3.3 Scan of Protected Paper Document

Figure 25:
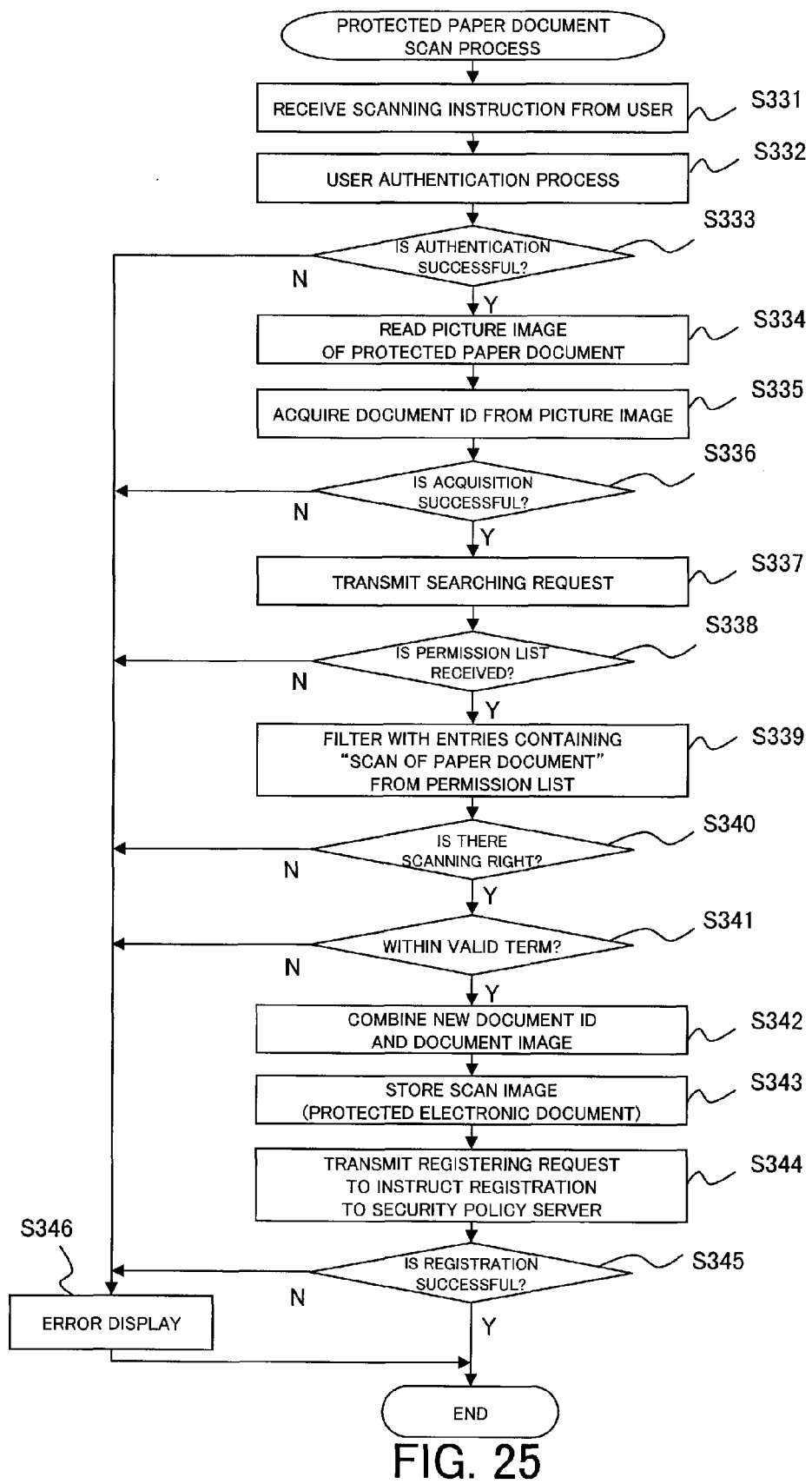
FIG. 25 is a flowchart showing a scan process of a protected paper document in a multifunction device in a first exemplary embodiment according to the present invention.

When a protected paper document is scanned, the image of the paper document is converted to electronic data, but the image must be created as a protected electronic document in the scan process. The basic processes for the scan of the protected paper document are similar to those in the copying process of the protected paper document in which the document is printed on a printing medium except that, in the scanning process of the protected paper document, the electronic data is stored in a storage in place of printing on a printing medium. The scanning process of the protected paper document will now be described with reference to a flowchart shown in FIG. 25.

A user places a protected paper document on the platen of the multifunction device 40 or on the ADF and presses a button of "scan protected document" displayed on the operation panel 13. When the controller 48 receives the scanning instruction through the pressing operation by the user (step 331), the controller 48 displays a user authentication dialog on the operation panel 13, and asks the user for an input of a user ID and a password. When the user inputs the user ID and password, the controller 48 sends the input user ID and password to the user authenticating unit 41. The user authenticating unit 41 checks whether or not the input information is correct by inquiring the external user authentication server 23 (step 332). When the user authentication is successful (Y in step 333), the user ID is maintained. When, on the other hand, the user authentication fails (N in step 333), the failure is displayed on the operation panel 13 (step 346), and the process is terminated.

After the user authentication is successful, the controller 48 scans the protected paper document and reads the image (step 334), and instructs the document ID decoding unit 47 to decode the picture image of the header and footer of the picture image, to acquire the document ID (step 335). When the document ID is incorporated in the protected paper document by watermarking, the watermark is decoded. When the decoding of the document ID is unsuccessful and the document ID is not acquired (N in step 336), the failure is displayed on the operation panel 13 (step 346), and the process is terminated.

When the decoding of the document ID is successful (Y in step 336), the controller 48 creates a searching request including various parameters including the decoded document ID and the user ID which is used for user authentication, and transmits the request to the security policy server 30 (step 337). The processes executed on the side of the security policy server 30 in response to the transmitted searching request have already been described in "1.3 Security Policy Search".

When error information such as information indicating that there is no search result is sent from the security policy server 30 in response to the searching request (N in step 338), the controller 48 displays an error message such as "you do not have scanning right" on the operation panel 13 and completes the process (step 346). When, on the other hand, a permission list is sent from the security policy server 30 as a search result (Y in step 338), the controller 48 refers to the permission list, and filters with only the entries containing "scan of paper document" (step 339). Although not included in the example configuration of FIG. 15, only the entries containing "Scan" in the Operation tag are extracted. When the permission list is created by merging permitted function lists, the presence/absence of "Scan" is checked. If "Scan" is not contained (N in step 340), it is determined that scanning right for the designated protected paper document is not attached for the user, and an error that "you do not have scanning right" is displayed on the operation panel 13 and the process is completed (step 346).

When, on the other hand, "Scan" is contained (Y in step 340), the controller 48 then refers to the search result remaining after the filtering process and checks whether or not there is a policy for which the valid term has not expired. Because the security policy server 30 is configured to not return the policies for which the valid term has expired, this process functions as a double-checking process. When there is no policy for which the valid term has not expired (N in step 341), an error message that "valid term of right has expired" is displayed and the process is completed (step 346).

When there is a policy for which the valid term has not expired (Y in step 341), the user is determined as having the scanning right, and the controller 48 temporarily stores the read image, document ID, and user ID in the image maintaining unit 43 and calls the protected electronic document creating unit 42. The protected electronic document creating unit 42 instructs the document ID creating unit 49 to create a new document ID and deletes the image of the document ID from the picture image of the protected paper document stored in the image maintaining unit 43, and then, the protected electronic document creating unit 42 encrypts the electronic document using a predetermined encryption key and combines the created document ID in the header and/or footer of the encrypted electronic document image, to create a protected electronic document to be stored (step 342). The protected electronic document is then stored in a location which can be accessed by a user of the multifunction device 40, for example, a private box of the user (step 343). In the scan process of the protected paper document also, similar to the copy process, the read image of the document ID is not simply stored, but rather decoded once and then encoded again, and thus the document ID data printed on the paper document is not degraded. The details of the process in the protected electronic document creating unit 42 are basically similar to the processes of the protected electronic document creating unit 54 in the client PC 50. Because of this, in FIG. 8, constituent elements related to the protected electronic document creation process are omitted.

Then, the controller 48 creates a registering request including parameters of the document ID of the origin document (derivation origin document ID), the newly created document ID, a user ID (operator ID), a media type (here, "paper"), creation date and time (current date and time), and an operation (here, "scan"), and transmits the request to the security policy server 30, to instruct registration of the protected electronic document (step 344). The processes executed on the side of the security policy server 30 in response to the transmitted registering request have already been described in "1.1 Security Policy Registration".

A normal completion of the process is confirmed by recognizing that the registering process is successful based on a processing result returned from the security policy server 30 in response to the registering instruction (Y in step 345). When, on the other hand, an indication of failure of the registering process is returned from the security policy server 30 (N in step 345), the controller 48 displays error information on the operation panel 13 or records an error log in the HDD 15, and completes the process (step 346).

Second Exemplary Embodiment

In the first exemplary embodiment, as is clear from the data structure of the security policy database 35 shown in FIG. 5, all of a definition of a policy which is applied after derivation (for original document and for derived document) is described in one policy definition for which one policy ID is assigned. When a policy is defined in this manner, the security policy searching unit 33 in the security policy server 30 must recognize, while searching through the document information database 36, whether the designated document is an original document or a derived document, the number of times of derivation if the document is a derived document, and what operation caused the derivation, and then, identify which part of the rights of the set policy is to be applied. In the second exemplary embodiment, the policy of the derived document in the policy definition is defined as a separate policy from the original document, and a policy ID which is assigned when a document is created by derivation is designated.

With such a configuration, although the client PC 50 must change, every time a document is derived, the ID of the policy to be registered on the side of the client PC 50 when a document is created by derivation, the security policy server 30 is no longer required to refer to the document type indicating whether the target document is an original document or a derived document, the number of derivations, and operation content during search of the policy to be applied to the document, and thus the policy search process can be simplified.

Figure 26:
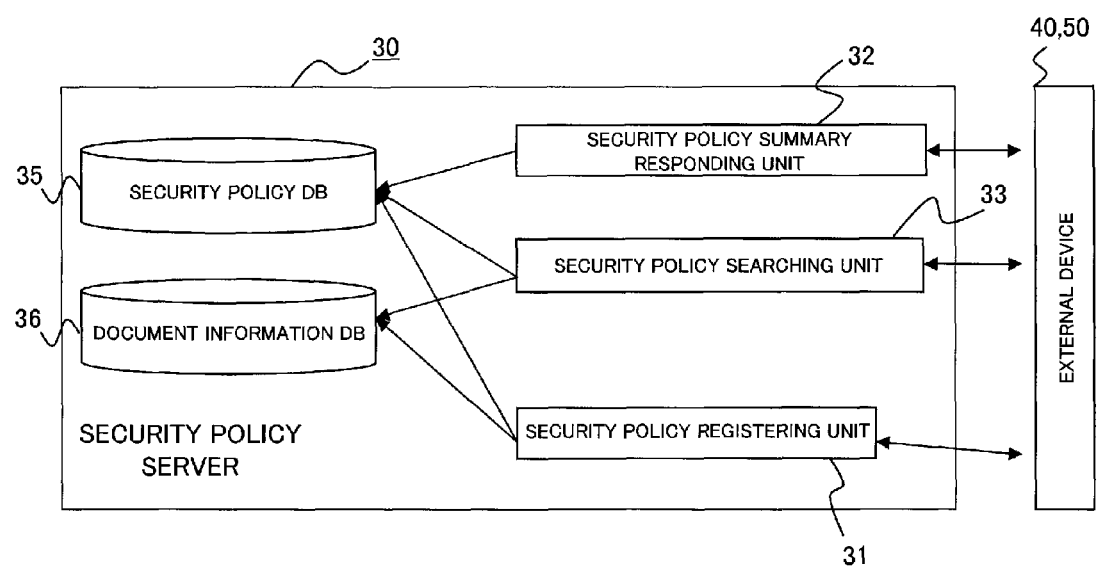
FIG. 26 is a block diagram showing a structure of a security policy server in a second exemplary embodiment according to the present invention.

FIG. 26 is a block diagram showing a structure of the security policy server 30 in the present exemplary embodiment. The structure differs from the first exemplary embodiment in the security policy searching unit 33. Specifically, because the determination in the first exemplary embodiment of the document type, that is, whether the target document is an original document or a derived document, is not necessary, the target document determining unit is not necessary. However, because the data structure of the security policy database 35 differs from that of the first exemplary embodiment, the processing content of the security policy searching unit 33 partially differs from that of the first exemplary embodiment.

FIG. 27 is a diagram showing an example data structure of the security policy database 35 in the present exemplary embodiment. In comparison to the data structure of the first exemplary embodiment, it can be seen that because a policy is not defied for each target document, the data item of "target document" no longer exists for each policy. In place of this data item, a data item of "policy ID at the time of derivation" is added. In the "policy ID at the time of derivation", a policy ID to be designated to a derived document when a document is created by derivation is set. According to the setting example shown in FIG. 27, for example, when a user belonging to the software development section copies an original document or a derived document to which a policy of the policy ID "0001" is applied, a policy of policy ID "0002" is applied to a paper document which is newly created by the copying process.

FIG. 28 is a diagram showing another example data structure of the security policy database 35 in the present exemplary embodiment. It is possible to allow, as in the data structure exemplified in FIG. 28, detailed designation, for each operation to be executed, of a policy to be attached to a document to be created by derivation.

FIG. 29 is a diagram showing an example data structure of the document information database 36 in the present exemplary embodiment. The structure differs from that of the first exemplary embodiment in that a policy ID is also set for a derived document. Therefore, the determination of whether a document is an original document or a derived document is made by determining whether or not data is set in the derivation origin document ID.

Next, processes in the present exemplary embodiment will be described. Here, only processes which differ from those in the first exemplary embodiment will be described. In the flowcharts which are referred to in the following description, step numbers which are identical to those in the first exemplary embodiment will be assigned for processes identical to those in the first exemplary embodiment.

1. Operation of Security Policy Server 30

The security policy server 30 provides 3 functions including registration, summary response, and search of the security policy for the external devices 40 and 50. In the present exemplary embodiment, only the search function differs from the first exemplary embodiment.

1.1 Security Policy Search

Figure 30:
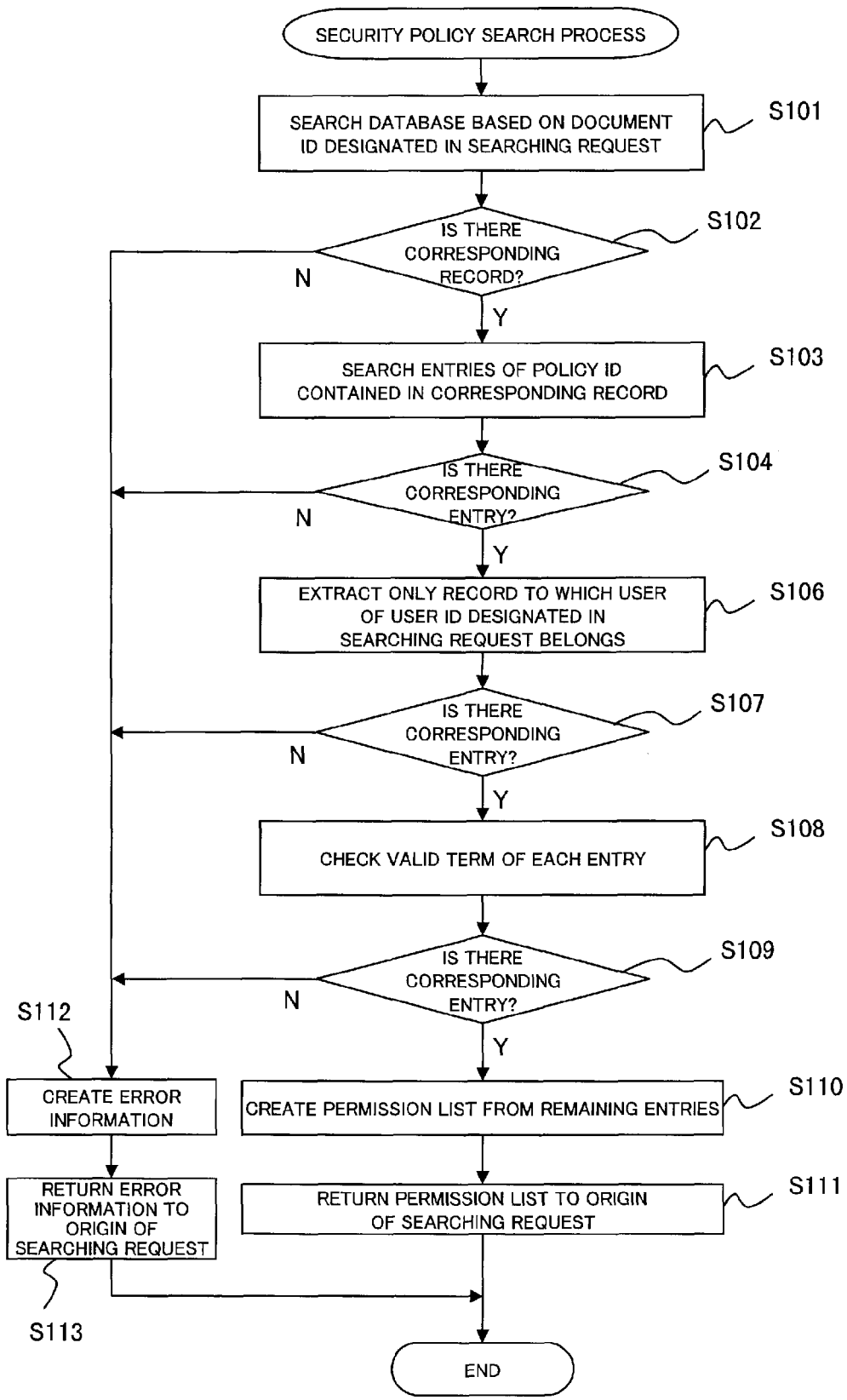
FIG. 30 is a flowchart showing a security policy search process in a second exemplary embodiment according to the present invention.

A security policy search process in the present exemplary embodiment will now be described with reference to a flowchart shown in FIG. 30.

When the security policy searching unit 33 is called by a searching request from an external device, the security policy searching unit 33 first searches the document information database 36 based on the document ID designated in the searching request (step 101). When a corresponding record is acquired (Y in step 102), the security policy database 35 is searched for an entry of the policy ID contained in the record (step 103). When an entry is acquired (Y in step 104), the security policy searching unit 33 refers to the usage range of the entry and filters only the user group to which the user of the user ID designated in the searching request belongs, and extracts the user group (step 106). For example, in the policy ID "0001" of FIG. 27, if the inquiring user is not the creator and belongs to the software development section, only the software development section in the derived document is extracted. The determination of whether or not a user is a creator is made by tracing the derivation relationship of the designated document to identify the original document and determining whether or not the operator ID of the record of the document ID of the original document matches the user ID of the user transmitting the searching request. In this manner, in the present exemplary embodiment, even when the search target document is a derived document, the creator of the original document is assumed to be the creator of this document. When no document is found, a null (NULL) is returned.

Alternatively, it is also possible to identify to which user group, such as the software development section, the user belongs by referring to a user information database (not shown) defining a correspondence relationship of a user group and users who belong to the user group. Similar to the first exemplary embodiment, in the security policy database 35 in the present exemplary embodiment, a usage range is set as the information of applied user for identifying the user to whom the policy is applied. When no item is set for the usage range, that is, when a policy is to be set common to all users, only one entry is correlated to the policy ID, and thus there is no need to search for an entry in step 103.

When a user group to which the user belongs is extracted (Y in step 107), the valid term is checked for each extracted entry (step 108). That is, for the item of usage range for each extracted entry, a valid term expiration date is created based on the creation date and time of the entry of the document ID. If the valid term expiration date is earlier than the current time, the entry is removed from the extracted entries. When one or more entries remain (Y in step 109), a permission list is created (step 110). When only one entry remains, the entry is set as the permission list. When multiple entries remain, the permitted lists of the items of the remaining usage ranges are merged and a permission list is created. Regarding the valid term expiration date and time, the latest date and time are selected.

A permission list thus created is returned as a search result to the external device transmitting the searching request (step 111). When there is no corresponding record or entry in the above-described process (N in step 102, N in step 104, N in step 107, or N in step 109), error information indicating that there is no corresponding record or entry is created (step 112), and is returned to the external device transmitting the searching request (step 113).

FIG. 31 shows an example policy search result returned to the origin of the searching request as a result of the above-described processes. As is clear from a comparison of FIG. 31 and FIG. 15 which is the corresponding diagram related to the first exemplary embodiment, in the present exemplary embodiment, a policy ID at the time of derivation ("0002" in FIG. 31) is added in the search result.

FIG. 32 shows an example policy search result for the case in which the security policy database 35 used in the present exemplary embodiment is configured to allow setting of a policy for each operation as shown in FIG. 28.

2. Operation of Client PC 50

The structure of the client PC 50 in the present exemplary embodiment may be the same as that of the first exemplary embodiment. More strictly, the processing content of the protected electronic document creating unit 54, specifically, the processes executed when a document is derived differs. A document is derived in the client PC 50 only when a storage process of an electronic document is executed.

2.1 Storage of Protected Electronic Document

In a storage process of a protected electronic document, when a document file to be stored is created, a document ID is reassigned for the document and information related to the document is registered in the security policy server 40. During this process, a policy ID at the time of derivation which is designated in the policy registered in the security policy database 35 is set as the policy of the derived document. A flowchart of the storage process in the present exemplary embodiment can be expressed in a manner similar to the flowchart of the fixed storage process of the protected electronic document in the first exemplary embodiment (FIG. 22), and thus the storage process in the present exemplary embodiment will be described with reference again to FIG. 22.

When a user selects a predetermined storage button through clicking or the like on the document processing application, the controller 61 receives the storing request corresponding to the user operation (step 261). The controller 61 determines that the electronic document stored in the document maintaining unit 57 is a protected electronic document if a document ID is assigned to the electronic document, and instructs the document ID creating unit 55 to create a document ID (step 262), creates a registering request including a parameter of a policy ID at the time of derivation in addition to the parameters of the document ID of the origin document (derivation origin document ID), the newly created document ID, a user ID (operator ID), a media type (here, "electronic"), creation date and time (current time), and an operation (here, "edit"), and transmits the request to the security policy server 30, to instruct registration of the protected electronic document (step 263). The processes executed on the side of the security policy server 30 in response to the transmitted registering request have already been described in "1.1 Security Policy Registration" of the first exemplary embodiment. Alternatively, it is also possible to employ a configuration in which, for the policy ID at the time of derivation, a result acquired as a result of a policy search when a target document is opened using the document processing application is stored in the RAM 18, and a policy designated from among the stored policies is used. In addition, the document ID of the electronic document stored in the document maintaining unit 57 is replaced with the newly created document ID.

When the controller 61 recognizes that the registration process is successful based on a processing result returned from the security policy server 30 in response to the registering instruction (Y in step 264), the controller 61 encrypts a non-protected document using a predetermined encryption key, correlates the assigned document ID, and writes and stores as a protected electronic document in the protected electronic document storage 53 (step 265).

When an indication of failure of the registration process is returned from the security policy server 30 (N in step 264), the controller 61 notifies the user of the failure by, for example, displaying error information on the display 8 (step 266).

In the storage of the protected electronic document described herein, the operation to store the document may be handled as an independent authority similar to operations such as printing and copying. In this case, the document processing application checks for the right, similar to the case of the edit process, before executing the storage process.

3. Operation of Multifunction Device 40

In the multifunction device 40, a derived document is created in all of printing, copying, and scanning processes for a protected document. The operation differs from that in the first exemplary embodiment in that, when a derived document is registered, a policy ID at the time of derivation designated in the policy registered in the security policy database 35 is set as the policy of the derived document.

3.1 Print of Protected Electronic Document

A printing process in the present exemplary embodiment can be expressed in a similar manner as the flowchart in the first exemplary embodiment (FIG. 23), and will be described with reference to this flowchart. The process in the present exemplary embodiment differs from the process in the flowchart of FIG. 23 only in the process of step 309, and so the other processes will not be described again.

In step 309, the controller 48 creates a registering request including, in addition to parameters of the document ID of the origin document (derivation origin document ID), the newly created document ID, and an operation (here, "print"), a parameter of a policy ID at the time of derivation, and transmits the request to the security policy server 30, to instruct registration of the protected electronic document. The policy ID at the time of derivation is included in the permission list transmitted from the security policy server 30 in response to the searching request.

3.2 Copy of Protected Paper Document

The copying process in the present exemplary embodiment can be expressed in a manner similar to the flowchart shown in relation to the first exemplary embodiment (FIG. 24), and thus, will be described with reference to this flowchart. In the present exemplary embodiment, only the process of step 324 in FIG. 24 differs from that of the first exemplary embodiment. Therefore, the other processes will not be described again.

In step 324, the controller 48 creates a registering request including, in addition to parameters of the document ID of the origin document (derivation origin document ID), the newly created document ID, the user ID (operator ID), a media type (here, "paper"), creation date and time (current time), and an operation (here, "copy"), the parameter of a policy ID at the time of derivation, and transmits the request to the security policy server 30, to instruct registration of the protected electronic document. The policy ID at the time of derivation is included in the permission list transmitted from the security policy server 30 in response to the searching request.

3.3 Scan of Protected Paper Document

The scanning process in the present exemplary embodiment can be expressed in a similar manner to the flowchart shown in relation to the first exemplary embodiment (FIG. 25), and thus will be described with reference to this flowchart. The present exemplary embodiment differs only in the process of step 344 in FIG. 25. Therefore, other processes will not be described again.

In step 344, the controller 48 creates a registering request including, in addition to the parameters of the document ID of the origin document (derivation origin document ID), the newly created document ID, the user ID (operator ID), a media type (here, "paper"), creation date and time (current time), and operation (here, "scan"), a parameter of a policy ID at the time of derivation, and transmits the request to the security policy server 30, to instruct registration of the protected electronic document. The policy ID at the time of derivation is included in the permission list transmitted from the security policy server 30 in response to the searching request.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A security policy management server computer operated by a processor, comprising:
  a policy information storage that stores policy setting information, identification information of a policy in correlation with each other, and data type information which indicates whether data for which the policy is set is original or derived data which is created by deriving from existing data, the policy setting information including setting content of the policy corresponding to each of the data type information indicating whether data for which the policy is set is original data or derived data which is created deriving from existing data;
  a data information storage that stores identification information of data for which a policy is set in correlation with the identification information of the policy attached to the data when the data is original data and that stores, when the data is the derived data, identification information of data for which a policy is set in correlation with identification information of the data from which the derived data is created as information for identifying that the data is the derived data; and
  a searching unit that, in response to a searching request designating the identification information of data, determines that target data of the searching request is the original data when the identification information of the policy correlated to the data whose identification information is designated in the searching request is obtained by referring to the data information storage; determines that the target data of the searching request is the derived data when the identification information of the policy is not obtained; obtains the identification information of the policy correlated to the identification information of the original data identified by identifying the identification information of the original data from which the derived data is created, which is correlated to the identification information of the derived data; and returns setting content of the policy identified by searching the policy information storage based on the identified identification information of the policy and a data type of the target data of the searching request to an origin of the searching request.

2. The security policy management server computer operated by a processor according to claim 1, further comprising:
  a first registering unit that registers, when a registering request of data including identification information of data to be registered and identification information of a policy to be attached to the data is received, the identification information of the data and the identification information of the policy included in the registering request in the data information storage in correlation with each other; and
  a second registering unit that registers, when a registering request including identification information of data to be registered and identification information of data which is a derivation origin of the data is received, the identification information of the data and the identification information of the data which is the derivation origin included in the registering request in the data information storage in correlation with each other.

3. The security policy management server computer operated by a processor according to claim 1, wherein the policy setting information stored in the policy information storage includes, in correlation with each other, the setting content of the policy, the data type information, and a number of derivations if the data type information indicates the derived data; and
  the searching unit identifies, when the searching unit identifies that the data whose identification information is designated in the searching request is the derived data, a number of derivations executed until the data is created by referring to the data information storage, and returns setting content of a policy identified by searching the policy information storage based on the identified identification information of the policy, the data type of the target data of the searching request, and the number of derivations, to the origin of the searching request.

4. A security policy management server computer operated by a processor comprising:
  a policy information storage that stores policy setting information, identification information of a policy in correlation with each other, and data type information which indicates whether data for which the policy is set is original or derived data which is created by deriving from existing data, the policy setting information including setting content of the policy corresponding to each of the data type information indicating whether data for which the policy is set is original data or derived data which is created deriving from existing data;
  a data information storage that stores identification information of data for which a policy is set, the identification information of a policy attached to the data, and policy setting information in correlation with each other, the policy setting information including the identification information of the policy to be attached to derived data when the derived data is created deriving from the data for which the policy is attached and setting content of the policy; and
  a searching unit that, in response to a searching request designating the identification information of data, determines that target data of the searching request is the original data when the identification information of the policy correlated to target data of the searching request is obtained by referring to the data information storage, determines that the target data of the searching request is the derived data when the identification information of the policy is not obtained, obtains the identification information of the policy correlated to the identification information of the original data identified by identifying the identification information of the original data from which the derived data is created, which is correlated to the identification information of the derived data, and returns setting content of a policy acquired by searching the policy information storage based on the identified identification information of the policy to an origin of the searching request.

5. The security policy management server computer operated by a processor according to claim 4, wherein the searching unit returns identification information of a policy at a time of derivation, acquired by searching the policy information storage based on the identified identification information of the policy to the origin of the searching request.

6. The security policy management server computer operated by a processor according to claim 5, wherein the policy setting information stored in the policy information storage includes, for each user operation permitted by the setting of the policy, identification information of a policy to be attached to derived data created by the user operation in correlation to the user operation.

7. The security policy management server computer operated by a processor according to claim 4, further comprising a registering unit that registers, when a registering request of data is received, identification information of data to be registered and the identification information of a policy included in the registering request, identification information of derivation origin data if the registering request further includes the identification information of the derivation origin data of the data, and operation content if the registering request further includes the user operation content, in the data information storage in correlation with each other.

8. A non-transitory recording medium storing a security policy management program causes a security policy server computer to execute a process, the process comprising:
 determining, in response to a searching request designating identification information of data, that target data of the searching request is the original data when identification information of a policy correlated with the data whose identification information is designated in the searching request is obtained by referring to a data information storage, determining that the target data of the searching request is the derived data when the identification information of the policy is not obtained, obtaining the identification information of the policy correlated to the identification information of the original data identified by identifying the identification information of the original data from which the derived data is created, which is correlated to the identification information of the derived data, and returning setting content of the policy identified by searching a policy information storage based on the identified identification information of the policy and a data type of the target data of the searching request to an origin of the searching request;
 the policy information storage storing policy setting information, identification information of a policy in correlation with each other, and data type information which indicates whether data for which the policy is set is original or derived data which is created by deriving from existing data, the policy setting information including setting content of the policy corresponding to each of the data type information indicating whether data for which the policy is set is original data or derived data which is created deriving from existing data; and
 the data information storage storing the identification information of data for which a policy is set in correlation with the data and the identification information of the policy attached to the data and storing, when the data is the derived data, information for identifying that the data is the derived data.

9. A non-transitory recording medium storing a security policy management program causes a security policy server computer to execute a process, the process comprising:
 determining, in response to a searching request designating identification information of data, that target data of the searching request is the original data when identification information of a policy correlated with target data of the searching request is obtained by referring to a data information storage, determining that the target data of the searching request is the derived data when the identification information of the policy is not obtained, obtaining the identification information of the policy correlated to the identification information of the original data identified by identifying the identification information of the original data from which the derived data is created, which is correlated to the identification information of the derived data, and returning setting content of a policy acquired by searching a policy information storage based on the identified identification information of the policy to an origin of the searching request;
 the policy information storage storing policy setting information, identification information of a policy in correlation with each other, and data type information which indicates whether data for which the policy is set is original or derived data which is created by deriving from existing data, the policy setting information including setting content of the policy corresponding to each of the data type information indicating whether data for which the policy is set is original data or derived data which is created deriving from existing data; and
 the data information storage storing the identification information of data for which a policy is set, the identification information of the policy attached to the data, and policy setting information in correlation with each other, the policy setting information including the identification information of the policy to be attached to derived data when the derived data is created deriving from the data for which the policy is attached and setting content of the policy.

10. A security policy management system comprising:
 a security policy server computer; and
 a client computer that is used for setting of a security policy, wherein the security policy server computer comprises:
 a policy information storage that stores policy setting information, identification information of a policy in correlation with each other, and data type information which indicates whether data for which the policy is set is original or derived data which is created by deriving from existing data, the policy setting information including setting content of the policy corresponding to each of the data type information indicating whether data for which the policy is set is original data or derived data which is created deriving from existing data;
 a data information storage that stores identification information of data for which a policy is set in correlation with the data and identification information of the policy attached to the data, and that also stores, when the data is the derived data, information for identifying that the data is the derived data; and
 a searching unit that determines that target data of the searching request is the original data when the identification information of the policy correlated to target data of the searching request is obtained by referring to the data information storage, determines that the target data of the searching request is the derived data when the identification information of the policy is not obtained, obtains the identification information of the policy correlated to the identification information of the original data identified by identifying the identification information of the original data from which the derived data is created, which is correlated to the identification information of the derived data, and returns setting content of a policy acquired by searching the policy information storage based on the identified identification information of the policy to an origin of the searching request.

* * * * *